US012665726B2

(12) United States Patent     (10) Patent No.:   US 12,665,726 B2

Lee et al.     (45) Date of Patent:    Jun. 23, 2026

(54) METHOD AND APPARATUS FOR TRANSMITTING AND RECEIVING UPLINK CONTROL INFORMATION IN A WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 18/280,112

(22) PCT Filed: Apr. 21, 2023

(86) PCT No.: PCT/KR2023/005504

§ 371 (c)(1),
(2) Date: Sep. 1, 2023

(87) PCT Pub. No.: WO2023/204685

PCT Pub. Date: Oct. 26, 2023

(65) Prior Publication Data

US 2025/0023697 A1     Jan. 16, 2025

Related U.S. Application Data

(60) Provisional application No. 63/334,048, filed on Apr. 22, 2022.

(51) Int. Cl.
| | |
|---|---|
| *H04L 5/00* | (2006.01) |
| *H04W 72/11* | (2023.01) |
| *H04W 72/21* | (2023.01) |

(52) U.S. Cl.
CPC ........... *H04L 5/0055* (2013.01); *H04W 72/11* (2023.01); *H04W 72/21* (2023.01)

(58) Field of Classification Search
CPC ...... H04L 5/0055; H04W 72/21; H04W 72/11
See application file for complete search history.

(56) References Cited

U.S. PATENT DOCUMENTS

| | | | |
|---|---|---|---|
| 11,956,780 B2 * | 4/2024 | Lee | ........................ H04L 1/1812 |
| 12,381,656 B2 * | 8/2025 | Dimou | .................. H04L 1/1812 |

(Continued)

FOREIGN PATENT DOCUMENTS

| | | |
|---|---|---|
| CN | 115836500 | 3/2023 |
| KR | 1020220008231 | 1/2022 |

(Continued)

OTHER PUBLICATIONS

PCT International Application No. PCT/KR2023/005504, International Search Report dated Aug. 16, 2023, 3 pages.

(Continued)

*Primary Examiner* — Michael J Moore, Jr.

(74) *Attorney, Agent, or Firm* — LEE, HONG, DEGERMAN, KANG & WAIMEY

(57)      ABSTRACT

A method and apparatus for transmitting and receiving uplink control information in a wireless communication system are disclosed. A method performed by a user equipment in a wireless communication system according to an embodiment of the present disclosure may comprise the steps of: receiving configuration information on one or more SPS configurations; and performing SPS PDSCH reception based on a specific SPS configuration among the one or more SPS configurations. Here, each of the one or more SPS configurations may be associated with one of a first HARQ-ACK mode based on a ACK value and a NACK value, and a second HARQ-ACK mode based on a NACK value. Based (Continued)

on the PUCCH resource related to HARQ-ACK transmission for the SPS PDSCH reception being invalid, the HARQ-ACK transmission may be deferred or dropped according to a HARQ-ACK mode associated with the specific SPS configuration.

12 Claims, 13 Drawing Sheets

(56) References Cited

U.S. PATENT DOCUMENTS

| | | | | |
|---|---|---|---|---|
| 2022/0007399 | A1 | 1/2022 | Rastegardoost et al. | |
| 2022/0038218 | A1 | 2/2022 | Kim et al. | |
| 2022/0046677 | A1* | 2/2022 | Talarico | H04W 72/23 |
| 2022/0078832 | A1* | 3/2022 | Elshafie | H04W 72/21 |
| 2023/0041764 | A1* | 2/2023 | Park | H04L 5/0055 |
| 2023/0163899 | A1* | 5/2023 | Chien | H04L 1/1854 |
| | | | | 370/336 |
| 2024/0163877 | A1* | 5/2024 | Xu | H04L 1/1812 |
| 2024/0298318 | A1* | 9/2024 | Andersson | H04W 72/1273 |
| 2024/0381366 | A1* | 11/2024 | Chien | H04W 72/11 |
| 2024/0405927 | A1* | 12/2024 | Wang | H04L 1/1816 |
| 2025/0008514 | A1* | 1/2025 | Chien | H04W 72/231 |
| 2025/0023697 | A1* | 1/2025 | Lee | H04L 5/00 |
| 2025/0141598 | A1* | 5/2025 | Takahashi | H04L 1/08 |
| 2025/0267663 | A1* | 8/2025 | Kim | H04W 72/0446 |

FOREIGN PATENT DOCUMENTS

| | | | | |
|---|---|---|---|---|
| KR | 20220015937 | 2/2022 | | |
| WO | WO-2021194301 A1 * | 9/2021 | | H04L 5/1469 |
| WO | 2022000318 | 1/2022 | | |

OTHER PUBLICATIONS

Nokia, Nokia Shanghai Bell, "HARQ-ACK Feedback Enhancements for URLL/IIoT," 3GPP TSG-RAN WG1 #104-e-bis, e-Meeting, R1-2102819, Apr. 2021, 21 pages.

Moderator (Huawei), "FL summary #4 on improving reliability for MBS for RRC_Connected UEs," 3GPP TSG-RAN WG1 #108-e, e-Meeting, R1-2202579, Mar. 2022, 128 pages.

Ericsson, "Mechanisms to support MBS group scheduling for RRC-Connected UEs," 3GPP TSG-RAN WG1 Meeting #106-bis-e, e-Meeting, R1-2110355, Oct. 2021, 31 pages.

European Patent Office Application Serial No. 23758196.2, Search Report dated Aug. 14, 2025, 9 pages.

* cited by examiner

METHOD AND APPARATUS FOR TRANSMITTING AND RECEIVING UPLINK CONTROL INFORMATION IN A WIRELESS COMMUNICATION SYSTEM

CROSS-REFERENCE TO RELATED APPLICATION(S)

This application is the National Stage filing under 35 U.S.C. 371 of International Application No. PCT/KR2023/005504, filed on Apr. 21, 2023, which claims the benefit of U.S. Provisional Application No. 63/334,048, filed on Apr. 22, 2022, the contents of which are all incorporated by reference herein in their entirety.

TECHNICAL FIELD

The present disclosure relates to a wireless communication system, and more particularly, to a method and apparatus for transmitting and receiving uplink control information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and apparatus for transmitting and receiving uplink control information.

A technical object of the present disclosure is to provide a method and apparatus for performing deferral/drop in transmitting HARQ-ACK for a group common semi-persistent scheduling (SPS) physical downlink shared channel (PDSCH).

A technical object of the present disclosure is to provide a method and apparatus for performing deferral/drop of a corresponding HARQ-ACK when NACK-only based HARQ-ACK is configured for SPS.

The technical objects to be achieved by the present disclosure are not limited to the above-described technical objects, and other technical objects which are not described herein will be clearly understood by those skilled in the pertinent art from the following description.

A method performed by a user equipment in a wireless communication system according to an aspect of the present disclosure may comprise: receiving configuration information on one or more semi-persistent scheduling (SPS) configurations; and performing SPS physical downlink shared channel (PDSCH) reception based on a specific SPS configuration among the one or more SPS configurations. Here, wherein each of the one or more SPS configurations is associated with one of a first hybrid automatic repeat request (HARQ)-ACK mode based on an acknowledgment (ACK) value and a non-acknowledgement (NACK) value, and a second HARQ-ACK mode based on a NACK value. Based on the PUCCH resource related to HARQ-ACK transmission for the SPS PDSCH reception being invalid, the HARQ-ACK transmission is deferred or dropped according to a HARQ-ACK mode associated with the specific SPS configuration.

A method performed by a base station in a wireless communication system according to an additional aspect of the present disclosure may comprise: transmitting configuration information on one or more semi-persistent scheduling (SPS) configurations; and performing SPS physical downlink shared channel (PDSCH) transmission based on a specific SPS configuration among the one or more SPS configurations. Here, wherein each of the one or more SPS configurations is associated with one of a first hybrid automatic repeat request (HARQ)-ACK mode based on an acknowledgment (ACK) value and a non-acknowledgement (NACK) value, and a second HARQ-ACK mode based on a NACK value. Based on the PUCCH resource related to HARQ-ACK transmission for the SPS PDSCH reception being invalid, the HARQ-ACK transmission is deferred or dropped according to a HARQ-ACK mode associated with the specific SPS configuration.

According to an embodiment of the present disclosure, a method and apparatus for transmitting and receiving uplink control information may be provided.

According to an embodiment of the present disclosure, a method and apparatus for performing deferral/drop in transmitting HARQ-ACK for a group common semi-persistent scheduling (SPS) physical downlink shared channel (PDSCH) may be provided.

According to an embodiment of the present disclosure, a method and apparatus for performing deferral/drop of a corresponding HARQ-ACK when NACK-only based HARQ-ACK is configured for SPS may be provided.

According to an embodiment of the present disclosure, SPS HARQ deferral operation for unicast SPS and multicast SPS may be clarified.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

DETAILED DESCRIPTION

Figure 1:
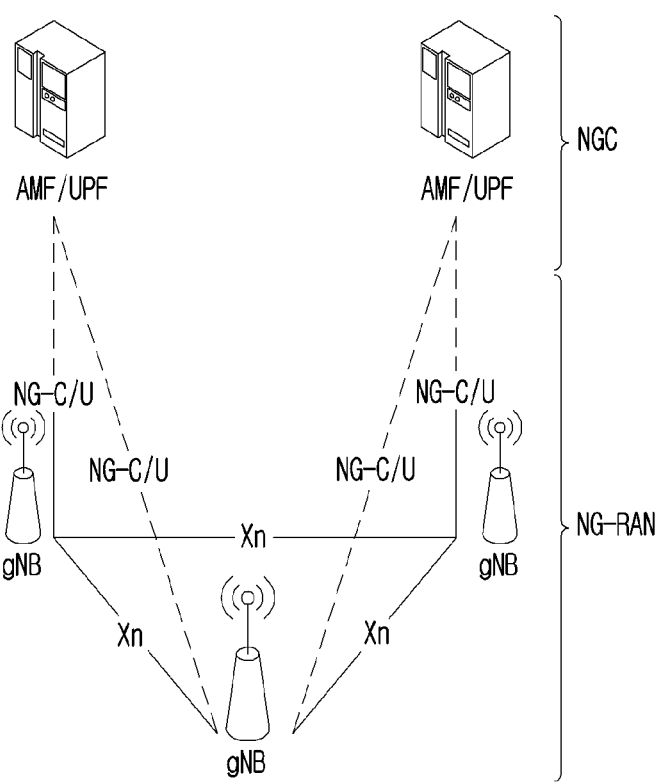
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio SSB (or SS/PBCH block): Synchronization signal block (including PSS (primary synchronization signal), sss (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
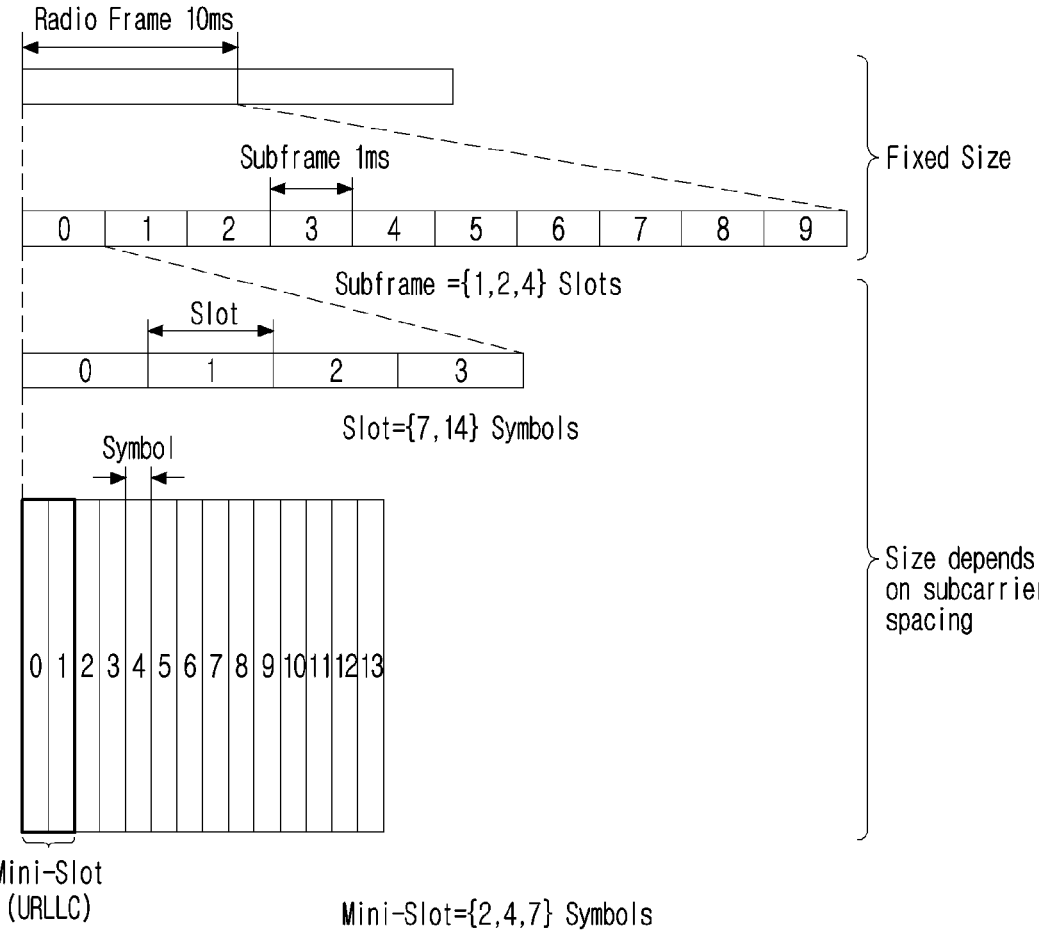
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max}N_f/100) \cdot T_c=10$ ms. Here, a radio frame is configured with 10 subframes having a duration of $T_{sf}=(\Delta f_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA, offset})T_c$ than a corresponding downlink frame in a corresponding terminal starts. For a subcarrier spacing configuration u, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot $(N_{symb}^{slot})$, the number of slots per radio frame $(N_{slot}^{frame,\mu})$ and the number of slots per subframe $(N_{slot}^{subframe,\mu})$ in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
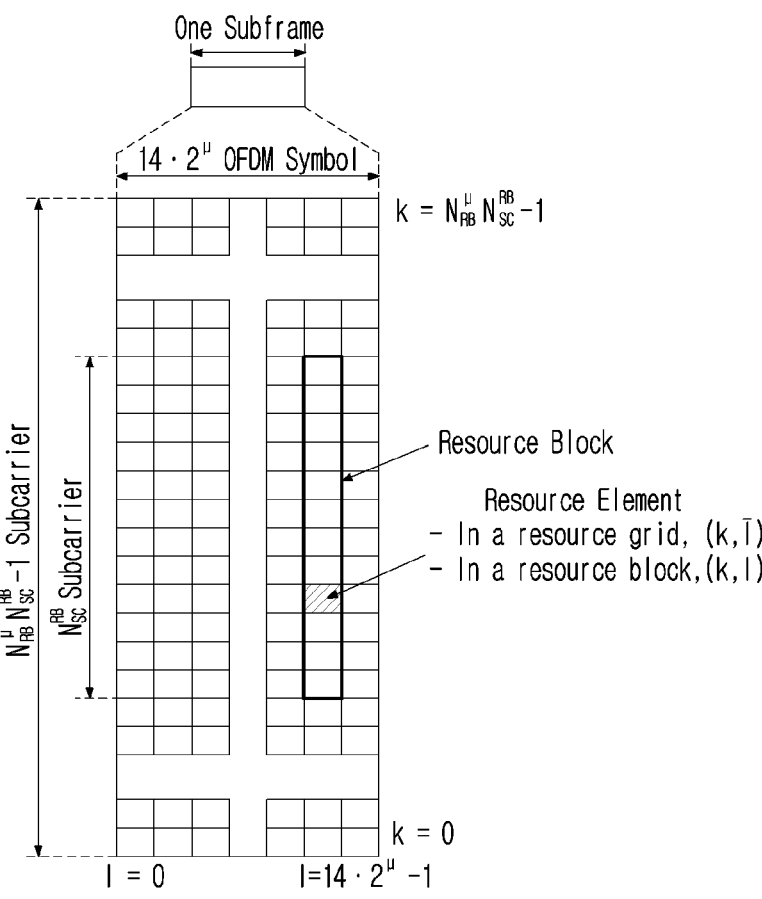
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k, l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and u may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number nCRBu and a resource element (k, 1) for a subcarrier spacing configuration u in a frequency domain is given as in the following Equation 1.

$$n_{CRB}^{\mu} = \left\lfloor \frac{k}{N_{sc}^{RB}} \right\rfloor$$ [Equation 1]

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu}$$ [Equation 2]

$N_{BWP,i}^{start,\mu}$ is a common resource block that a BWP starts relatively to common resource block 0.

Figure 4:
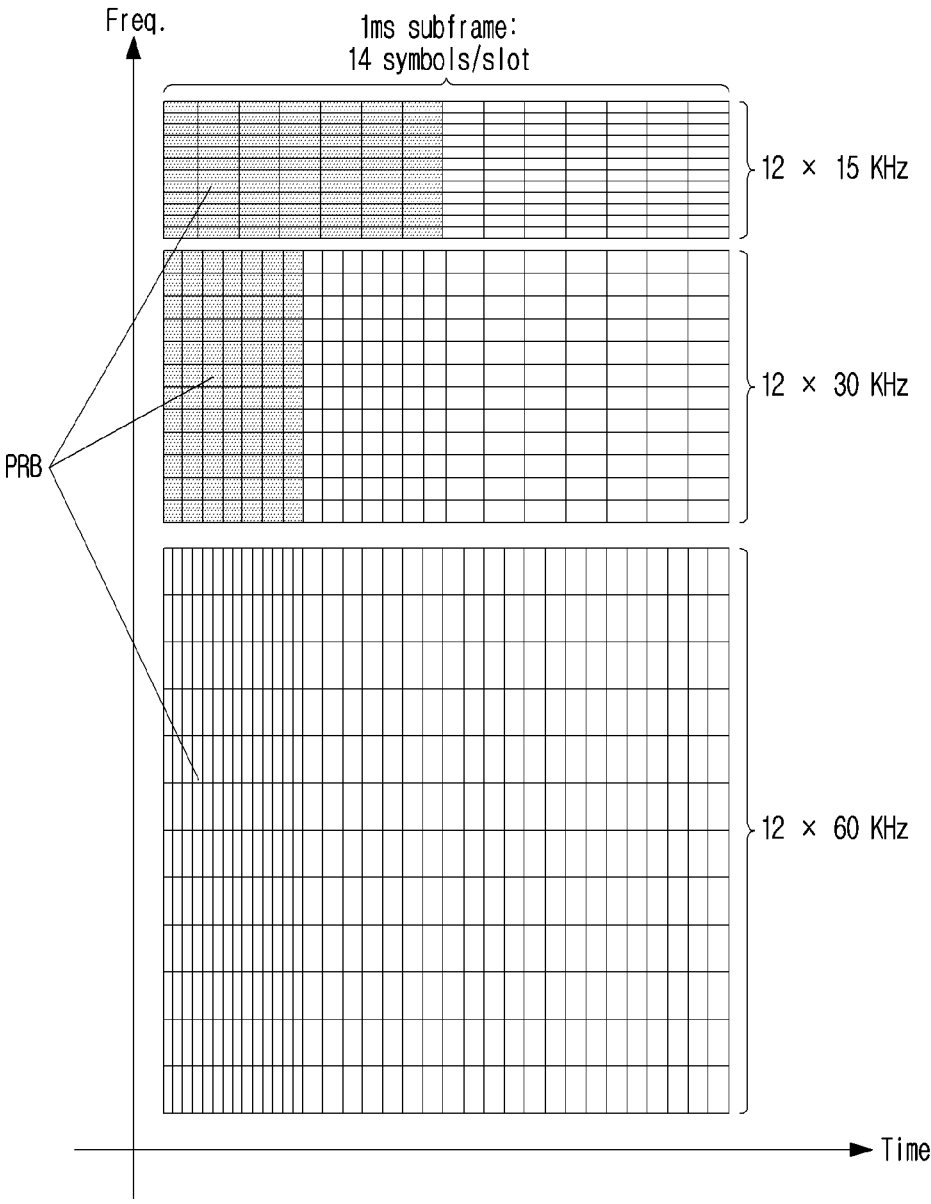
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
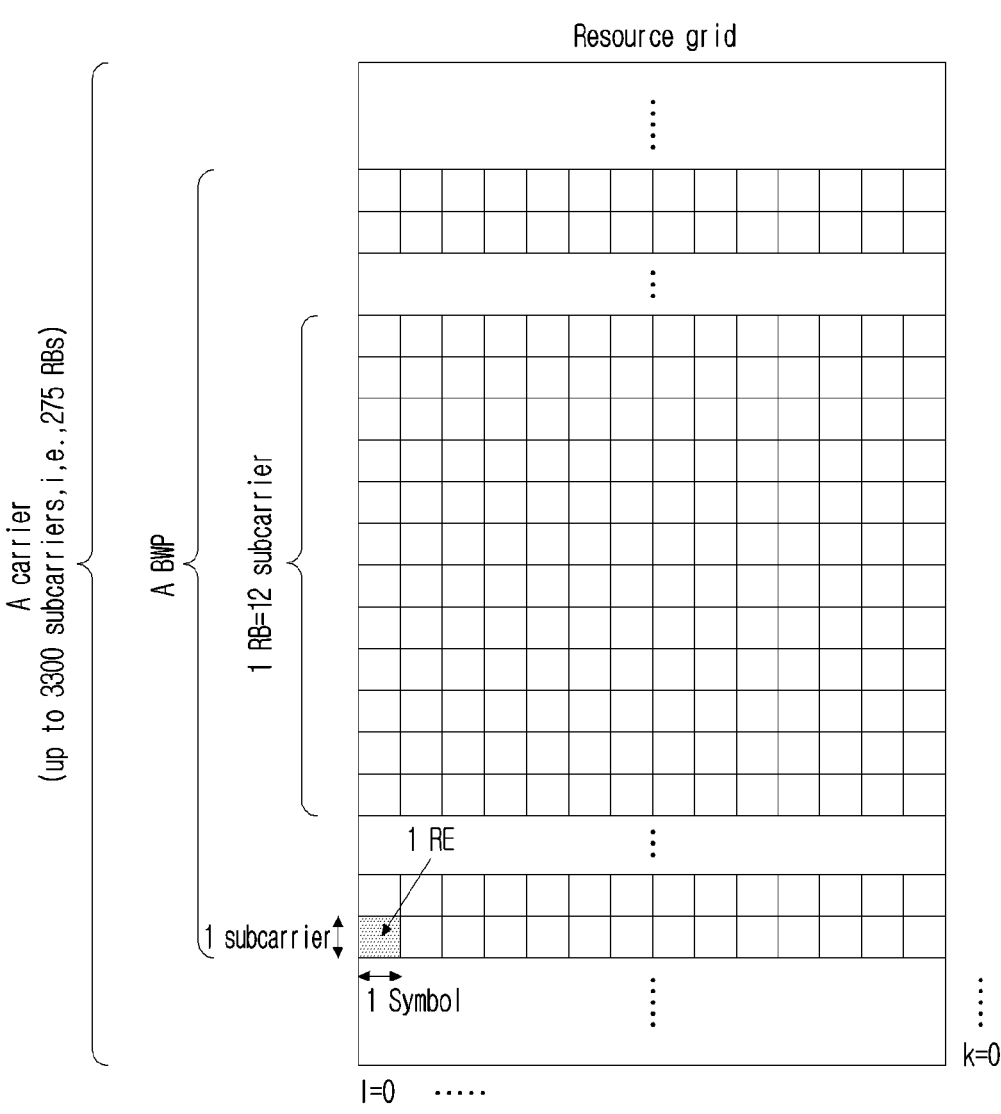
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
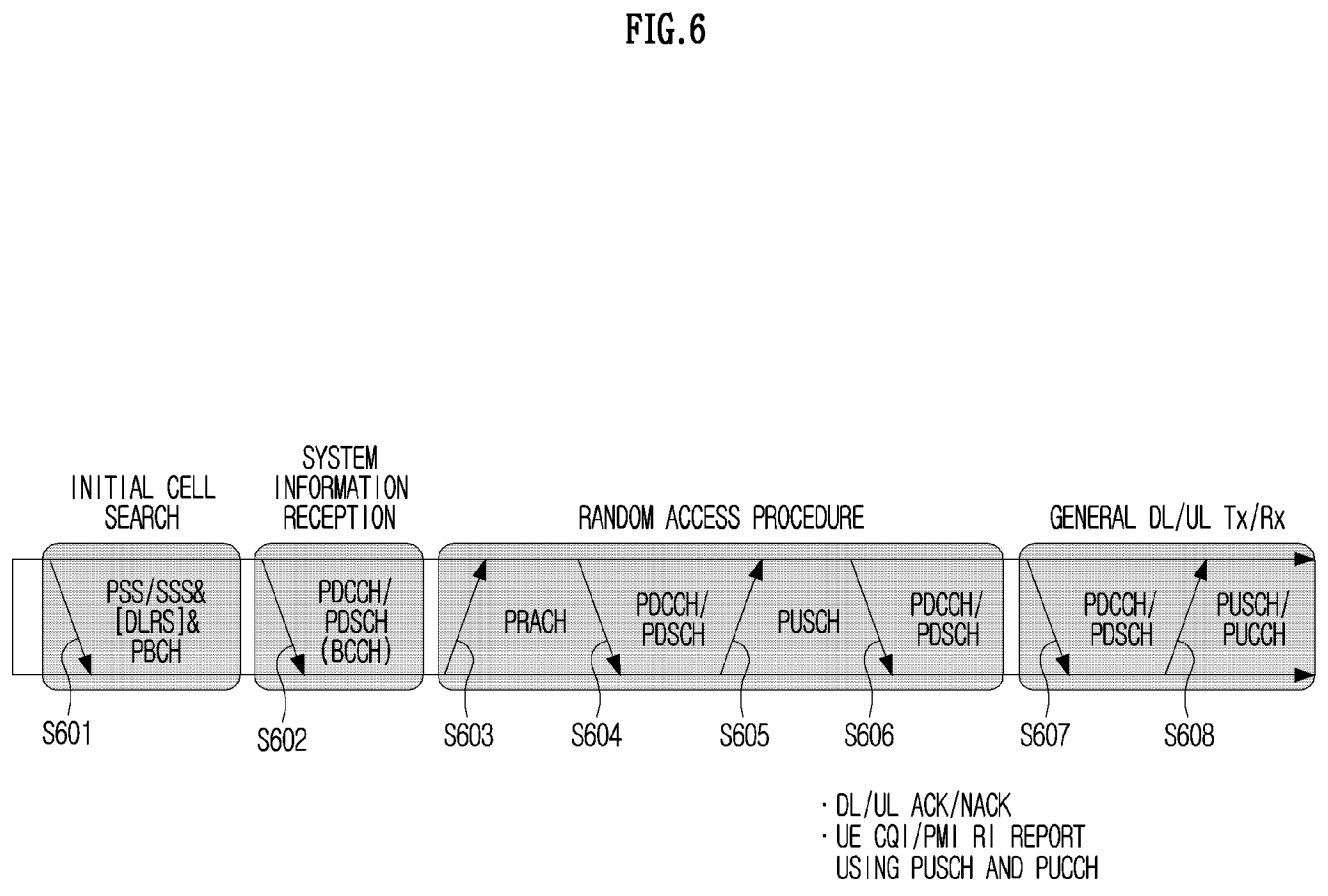

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/ PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

- 'QCL-TypeA': {Doppler shift, Doppler spread, average delay, delay spread}
    - 'QCL-TypeB': {Doppler shift, Doppler spread}
    - 'QCL-TypeC': {Doppler shift, average delay}
    - 'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (COMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a COMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

A UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH) transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7:
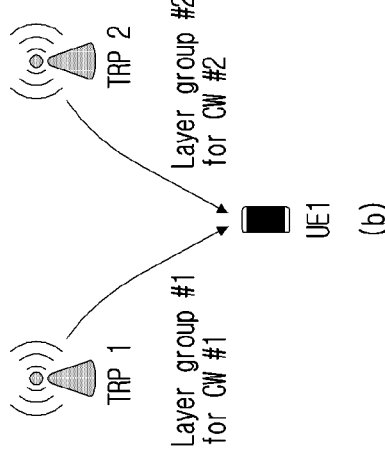
FIG. 7 illustrates a method of multiple TRPs transmission in a wireless communication system to which the present disclosure may be applied.
Figure 7:
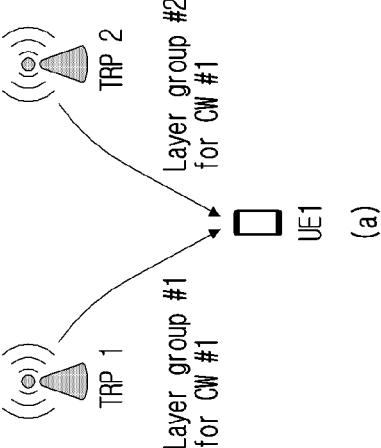

FIG. 7 illustrates a method of multiple TRPs transmission in a wireless communication system to which the present disclosure may be applied.

In reference to FIG. 7(a), it is shown a case in which layer groups transmitting the same codeword(CW)/transport block(TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRP scheduled by at least one DCI may be performed as follows:

i) Scheme 1 (SDM): n (n is a natural number) TCI states in a single slot in overlapping time and frequency resource allocation Scheme 1a: Each transmission occasion is one layer or set of layers of the same TB, and each layer or set of layers is associated with one TCI and one set of DMRS port(s). A single codeword with one redundancy version (RV) is used for all layers or sets of layers. For a UE, different coded bits are mapped to different layers or sets of layers with specific mapping rules.

Scheme 1b: Each transmission occasion is one layer or set of layers of the same TB, and each layer or set of layers is associated with one TCI and one set of DMRS port(s). A single codeword with one RV is used for each spatial layer or set of layers. RVs corresponding to each spatial layer or set of layers may be the same or different.

Scheme 1c: Each transmission occasion is one layer of the same TB having one DMRS port associated with multiple TCI state indices or one layer of the same TB with multiple DMRS ports associated with multiple TCI indices in turn (one by one).

In schemes 1a and 1c described above, the same MCS is applied to all layers or sets of layers.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) is associated with all non-overlapping frequency resource allocations.

Scheme 2a: A single codeword with one RV is used across an entire resource allocation. For UE, a common RB mapping (mapping of codeword to layer) is applied across all resource allocations.

Scheme 2b: A single codeword with one RV is used for each non-overlapping frequency resource allocation. RVs corresponding to each non-overlapping frequency resource allocation may be the same or different.

In scheme 2a, the same MCS is applied to all non-overlapping frequency resource allocations.

iii) Scheme 3 (TDM): n (n is a natural number) TCI states in a single slot in non-overlapping time resource allocation. Each transmission occasion of a TB has one TCI and one RV with time granularity of a mini-slot. All transmission occasion(s) in a slot use a common MCS with the same single or multiple DMRS port(s). An RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) across K slots use a common MCS with the same single or multiple DMRS port(s). An RV/TCI state may be the same or different among transmission occasions.

Hereinafter, in the present disclosure, DL MTRP-URLLC means that M-TRPs transmit the same data (e.g., transport block, TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is indicated which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be indicated. UE may achieve high reliability because it receives the same data/DCI through resource 1 and resource 2. Such DL MTRP URLLC may be applied to a PDSCH/a PDCCH.

Conversely, UL MTRP-URLLC means that M-TRPs receive the same data/UCI from UE by using a different layer/time/frequency resource. For example, TRP 1 receives the same data/UCI from UE in resource 1 and TRP 2 receives the same data/UCI from UE in resource 2 and shares received data/UCI through a backhaul link connected between TRPs. UE configured with a UL MTRP-URLLC transmission method transmits the same data/UCI by using a different layer/time/frequency resource. Here, UE is indicated which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be indicated. Such UL MTRP URLLC may be applied to a PUSCH/a PUCCH.

In addition, in methods proposed in the present disclosure, when a specific TCI state (or a TCI) is used (/mapped) in receiving data/DCI/UCI for any frequency/time/space resource, it may mean that a DL estimates a channel from a DMRS by using a QCL type and a QCL RS indicated by a corresponding TCI state in that frequency/time/space resource and receives/demodulates data/DCI to an estimated channel. It may mean that an UL transmits/modulates a DMRS and data/UCI by using a Tx beam and/or Tw power indicated by a corresponding TCI state in that frequency/time/space resource.

The UL TCI state has Tx beam and/or Tx power information of UE and spatial relation information, etc. instead of a TCI state may be configured to UE through other parameter. An UL TCI state may be directly indicated to UL grant DCI or may mean spatial relation information of an SRS resource indicated by an SRI (SRS resource indicator) field of UL grant DCI. Alternatively, it may mean an OL (open loop) Tx power control parameter connected to a value indicated by a SRI field of UL grant DCI (j: an index for open loop parameter Po and alpha ($\alpha$) (up to 32 parameter value sets per cell), q_d: an index of a DL RS resource for PL (pathloss) measurement (measurement of up to 3 per cell), l: a closed loop power control process index (up to 2 processes per cell)).

On the other hand, it is assumed that MTRP-eMBB means that M-TRPs transmit other data by using a different layer/time/frequency, UE configured with a MTRP-eMBB transmission method is indicated multiple TCI states with DCI and data received by using a QCL RS of each TCI state is different data.

In addition, whether of MTRP URLLC transmission/reception or MTRP eMBB transmission/reception may be understood by UE by separately classifying a RNTI for MTRP-URLLC and a RNTI for MTRP-eMBB and using them. In other words, when CRC masking of DCI is performed by using a RNTI for URLLC, it is considered as URLLC transmission and when CRC masking of DCI is performed by using a RNTI for eMBB, it is considered as eMBB transmission. Alternatively, a base station may configure MTRP URLLC transmission/reception or may configure MTRP eMBB transmission/reception to UE through other new signaling.

In the present disclosure, for convenience of a description, a proposal is applied by assuming cooperative transmission/reception between 2 TRPs, but it may be extended and applied in 3 or more multi-TRP environments and it may be also extended and applied in multi-panel environments. A different TRP may be recognized by UE as a different transmission configuration indication (TCI) state. That is, when UE receives/transmits data/DCI/UCI by using TCI state 1, it means that data/DCI/UCI is received/transmitted from/to TRP 1.

A proposal of the present disclosure may be utilized in a situation where MTRP cooperatively transmits a PDCCH (the same PDCCH is repetitively or partitively transmitted) and some proposals may be utilized even in a situation where MTRP cooperatively transmits a PDSCH or cooperatively receives a PUSCH/a PUCCH.

In addition, in the present disclosure below, the meaning that a plurality of base stations (i.e., MTRP) repetitively transmits the same PDCCH may mean the same DCI is transmitted by a plurality of PDCCH candidates, and it is equivalent with the meaning that a plurality of base stations repetitively transmits the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N(ACK/NACK) based on a reception time of DCI. Here, if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure below, when a plurality of base stations (i.e., MTRP) divide and transmit the same PDCCH, it may mean that one DCI is transmitted through one PDCCH candidate, but TRP 1 transmits some resources in which the PDCCH candidate is defined and TRP 2 transmits the remaining resources. For example, when TRP 1 and TRP 2 divide and transmit a PDCCH candidate corresponding to an aggregation level m1+m2, the PDCCH candidate is divided into PDCCH candidate 1 corresponding to aggregation level m1 and PDCCH candidate 2 corresponding to aggregation level m2, and TRP 1 transmits the PDCCH candidate 1 and TRP 2 transmits the PDCCH candidate 2 using different time/frequency resources. After receiving the PDCCH candidate 1 and the PDCCH candidate 2, a UE generates a PDCCH candidate corresponding to aggregation level m1+m2 and attempts DCI decoding.

When the same DCI is divided and transmitted to several PDCCH candidates, there may be two implementation methods.

First, a DCI payload (control information bits+CRC) may be encoded through one channel encoder (e.g., a polar encoder), coded bits obtained as a result may be divided into two TRPs and transmitted. In this case, an entire DCI payload may be encoded in coded bits transmitted by each TRP, or only a part of a DCI payload may be encoded. Second, a DCI payload (control information bits+CRC) may be divided into two (DCI 1 and DCI 2) and each can be encoded through a channel encoder (e.g., polar encoder). Thereafter, two TRPs may transmit coded bits corresponding to DCI 1 and coded bits corresponding to DCI 2, respectively.

In summary, it may be as follows that a plurality of base stations (i.e., MTRP) divide/repeat the same PDCCH and transmit over a plurality of monitoring occasions (MO).

i) it may mean that each base station (i.e., STRP) repeatedly transmits coded DCI bits obtained by encoding all DCI contents of a corresponding PDCCH through each MO; or, ii) it may mean that coded DCI bits obtained by encoding all DCI contents of a corresponding PDCCH are divided into a plurality of parts, and each base station (i.e., STRP) transmits a different part through each MO; or iii) it may mean that DCI contents of a corresponding PDCCH are divided into a plurality of parts, and each base station (i.e., STRP) separately encodes different parts and transmits them through each MO.

That is, it may be understood that a PDCCH is transmitted multiple times over several transmission occasions (TO) regardless of repeated transmission or divided transmission of the PDCCH. Here, a TO means a specific time/frequency resource unit in which a PDCCH is transmitted. For example, if a PDCCH is transmitted multiple times (in a specific resource block (RB)) over slots 1, 2, 3, and 4, a TO may mean each slot, or if a PDCCH is transmitted multiple times (in a specific slot) over RB sets 1, 2, 3, and 4, a TO may mean each RB set, or if a PDCCH is transmitted multiple times over different times and frequencies, a TO may mean each time/frequency resource. In addition, a TCI state used for DMRS channel estimation for each TO may be configured differently, and it may be assumed that TOs in which a TCI state is configured differently are transmitted by different TRPs/panels. When a plurality of base stations repeatedly transmits or dividedly transmits a PDCCH, it means that the PDCCH is transmitted over a plurality of TOs, and the union of TCI states configured in corresponding TOs is configured with two or more TCI states. For example, if a PDCCH is transmitted over TOs 1, 2, 3, 4, TCI states 1, 2, 3, 4 may be configured in each of TOs 1, 2, 3, 4, respectively, which means that TRP i transmits cooperatively a PDCCH in TO i.

For a plurality of TOs indicated to a UE to repeatedly transmit or dividedly transmit a PDCCH/PDSCH/PUSCH/PUCCH, UL transmits to a specific TRP or DL receives from a specific TRP in each TO. Here, a UL TO (or TO of TRP 1) transmitted to TRP 1 means a TO using the first value among two spatial relations, two UL TCIs, two UL power control parameters and/or two pathloss reference signals (PLRS) indicated to a UE, and a UL TO (or TO of TRP 2) transmitted to TRP 2 means a TO using the second value among two spatial relations, two UL TCIs, two UL power control parameters and/or two PLRSs indicated to a UE. Similarly, for DL transmission, a DL TO (or TO of TRP 1) transmitted by TRP 1 means a TO using the first value among two DL TCI states (e.g., when two TCI states are configured in CORESET) indicated to a UE, and a DL TO (or TO of TRP 2) transmitted by TRP 2 means a TO using the second value among two DL TCI states (e.g., when two TCI states are configured in CORESET) indicated to a UE.

The proposal of the present disclosure can be extended and applied to various channels such as PUSCH/PUCCH/PDSCH/PDCCH.

The proposal of the present disclosure can be extended and applied to both a case of repeated transmission and a case of divided transmission the channel on different time/frequency/spatial resources.

Figure 8:
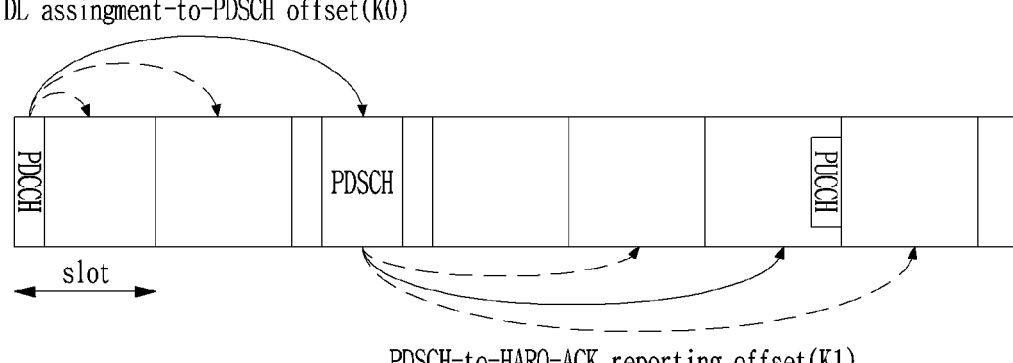
FIG. 8 illustrates a HARQ-ACK process for downlink data in a wireless communication system to which the present disclosure can be applied.

Data Transmission and HARQ (Hybrid Automatic Repeat and Request)-ACK (Acknowledgement) Process FIG. 8 illustrates a HARQ-ACK process for downlink data in a wireless communication system to which the present disclosure can be applied.

Referring to FIG. 8, a UE may detect a PDCCH in slot #n. Here, a PDCCH includes downlink scheduling information (e.g., DCI formats 1_0 and 1_1), and a PDCCH indicates a DL assignment-to-PDSCH offset (K0) and a PDSCH-HARQ-ACK reporting offset (K1). For example, DCI formats 1_0 and 1_1 may include the following information.

Frequency domain resource assignment: Indicates an RB resource (e.g., one or more (dis) contiguous RBs) allocated to a PDSCH Time domain resource assignment: K0, indicating a start position (e.g., OFDM symbol index) and a length (e.g., number of OFDM symbols) of a PDSCH in a slot PDSCH HARQ feedback timing indicator (PDSCH-to-HARQ feedback timing indicator): Indicates K1

HARQ process number (4 bits): Indicates HARQ process ID (Identity) for data (e.g., PDSCH, TB)

PUCCH resource indicator (PRI): Indicates a PUCCH resource to be used for UCI transmission among a plurality of PUCCH resources in a PUCCH resource set Thereafter, a UE may receive a PDSCH in slot #(n+K0) according to scheduling information of slot #n, and then transmit UCI through a PUCCH in slot #(n+K1). Here, UCI includes a HARQ-ACK response for a PDSCH. If a PDSCH is configured to transmit up to 1 TB, a HARQ-ACK response may be composed of 1-bit. When a PDSCH is configured to transmit up to two TBs, a HARQ-ACK response may be composed of 2-bits if spatial bundling is not configured and 1-bit if spatial bundling is configured. When a HARQ-ACK transmission time for a plurality of PDSCHs is designated as slot #(n+K1), UCI transmitted in slot #(n+K1) includes HARQ-ACK responses for a plurality of PDSCHs.

Multimedia Broadcast/Multicast Service (MBMS)

MBMS can be divided into i) a single frequency network (SFN) method in which a plurality of base station cells are synchronized to transmit the same data through a physical multicast channel (PMCH) and ii) SC-PTM (Single Cell Point To Multipoint) method broadcasting within a cell coverage through a PDCCH/PDSCH channel. The SFN method is used to provide broadcasting services over a wide area (e.g., MBMS area) through semi-statically allocated resources, while the SC-PTM method is mainly used to provide broadcasting services only within a cell coverage through dynamic resources.

The SC-PTM provides one logical channel, an SC-MCCH (Single Cell Multicast Control Channel) and one or a plurality of logical channels, an SC-MTCH (Single Cell Multicast Traffic Channel). These logical channels are mapped to a downlink shared channel (DL-SCH), which is a transport channel, and a PDSCH, which is a physical channel. A PDSCH transmitting SC-MCCH or SC-MTCH data is scheduled through a PDCCH indicated by a group-RNTI (G-RNTI). In this case, a temporary multicast group ID (TMGI) corresponding to a service identifier (ID) may be mapped one-to-one with a specific G-RNTI value. Therefore, if a base station provides multiple services, multiple G-RNTI values may be allocated for SC-PTM transmission. One or a plurality of UEs may perform PDCCH monitoring using a specific G-RNTI to receive a specific service. Here, a DRX on-duration period may be configured exclusively for an SC-PTM for a specific service/specific G-RNTI. In this case, the UEs wake up only for a specific on-duration period and perform PDCCH monitoring for the G-RNTI.

Method for Performing Deferral/Drop of HARQ-ACK Transmission for Group Common Semi-Persistent Scheduling (SPS) PDSCH PUCCH: Physical Uplink Control channel PUSCH: Physical Uplink Shared Channel MCCH: Multicast Control Channel MTCH: Multicast Traffic Channel RRM: Radio resource management RLM: Radio link monitoring SCS: Sub-carrier spacing RLM: Radio link monitoring DCI: Downlink Control Information CAP: Channel Access Procedure Ucell: Unlicensed cell PCell: Primary Cell PSCell: Primary SCG Cell TBS: Transport Block Size TDRA: Time Domain Resource Allocation SLIV: Starting and Length Indicator Value (An indication value for a starting symbol index and the number of symbols in a slot of a PDSCH and/or a PUSCH. It may be configured as a component of an entry constituting a TDRA field in a PDCCH that schedules a corresponding PDSCH and/or PUSCH.)

BWP: BandWidth Part (It may be composed of continuous resource blocks (RBs) on a frequency axis. It may correspond to one numerology (e.g., SCS, CP length, slot/mini-slot duration, etc.). In addition, a plurality of BWPs may be configured in one carrier (the number of BWPs per carrier may also be limited), but the number of activated BWPs may be limited to a part (e.g., one) per carrier.)

CORESET: control resource set (CONtrol REsourse SET) (It means a time-frequency resource region in which a PDCCH can be transmitted, and the number of CORE-SETs per BWP may be limited.)

REG: Resource element group

SFI: Slot Format Indicator (An indicator indicating a symbol level DL/UL direction within a specific slot(s), transmitted through a group common PDCCH).

COT: Channel occupancy time

SPS: Semi-persistent scheduling

QCL: Quasi-Co-Location (A QCL relationship between two reference signals (RS) may mean that a QCL parameter obtained from one RS such as a Doppler shift, a Doppler spread, an average delay, a delay spread, a spatial Rx parameter, etc. can also be applied to another RS (or antenna port(s) of a corresponding RS). In the NR system, 4 QCL types are defined as follows. 'typeA': {Doppler shift, Doppler spread, average delay, delay spread}, 'typeB': {Doppler shift, Doppler spread}, 'typeC': {Doppler shift, average delay}, 'typeD': {Spatial Rx parameter}. For certain DL RS antenna port(s), a first DL RS may be configured as a reference for QCL type X (X=A, B, C, or D), and a second DL RS may be configured as a reference for QCL type Y (Y=A, B, C, or D, but X+Y).)

TCI: Transmission Configuration Indication (One TCI state includes a QCL relationship between DM-RS ports of a PDSCH, DM-RS ports of a PDCCH, or CSI-RS port(s) of a CSI-RS resource and one or more DL RSs. For 'Transmission Configuration Indication' among fields in DCI that schedules a PDSCH, a TCI state index corresponding to each code point constituting the field is activated by a MAC control element (CE), and a TCI state configuration for each TCI state index is configured through RRC signaling. In the Rel-16 NR system, a corresponding TCI state is configured between DL RSs, but a configuration between a DL RS and a UL RS or between a UL RS and a UL RS may be allowed in a future release. Examples of a UL RS include an SRS, a PUSCH DM-RS, and a PUCCH DM-RS.)

SRI: SRS resource indicator (It indicates one of SRS resource index values configured in 'SRS resource indicator' among fields in DCI scheduling a PUSCH. When transmitting a PUSCH, a UE may transmit the PUSCH using the same spatial domain transmission filter used for transmission and reception of a reference signal associated with the corresponding SRS resource. Here, a reference RS is configured by RRC signaling through an SRS spatial relation information parameter (SRS-SpatialRelationInfo) for each SRS resource, and an SS/PBCH block, a CSI-RS, or an SRS may be configured as the reference RS.)

TRP: Transmission and Reception Point

PLMN ID: Public Land Mobile Network identifier

RACH: Random Access Channel

RAR: Random Access Response

Msg3: This is a message transmitted through an uplink shared channel (UL-SCH) including a C-RNTI MAC CE or a common control channel (CCCH) service data unit (SDU), provided from a higher layer, and associated with a UE Contention Resolution Identity as part of a random access procedure.

Special Cell: In case of a dual connectivity operation, the term special cell refers to the PCell of a master cell group (MCG) or the PSCell of a secondary cell group (SCG) depending on whether a MAC entity is related to the MCG or the SCG, respectively. Otherwise, the term Special Cell refers to the PCell. The Special Cell supports PUCCH transmission and contention-based random access and is always active.

Serving Cell: It includes the PCell, the PSCell, and the secondary cell (SCell).

CG: Configured Grant

Type 1 CG or Type 2 CG: Type 1 configured grant or Type 2 configured grant

Fall-back DCI: It indicates a DCI format that can be used for a fall-back operation, and for example, corresponds to DCI formats 0_0 and 1_0.

non-fall-back DCI: It indicates a DCI format other than the fall-back DCI, for example, corresponds to DCI formats 0_1 and 1_1.

SS: search space

FDRA: frequency domain resource allocation

TDRA: time domain resource allocation

LP, HP: Low (er) priority, High (er) priority

A/N for cell A: A/N (acknowledgement/negative acknowledgment) information for data (e.g., PDSCH) received in cell A UL CI: Uplink cancelation indication CFR: Common frequency resource for multicast and broadcast service (MBS). One DL CFR provides group common PDCCH and group common PDSCH transmission resources for MBS transmission and reception. One UL CFR provides HARQ-ACK PUCCH resources for group common PDSCH reception. One CFR is one MBS specific BWP or one UE specific BWP. Alternatively, one or a plurality of CFRs may be configured in one UE specific BWP. One CFR is associated with one UE specific BWP.

TMGI: Temporary Mobile Group Identity. As an MBS service identifier, it indicates a specific service.

G-RNTI: Group Radio Network Temporary Identifier. It indicates a UE group identifier that receives an MBS.

The above contents (3GPP system, frame structure, NR system, etc.) can be applied in combination with methods proposed in the present disclosure to be described later, or it may be supplemented to clarify the technical characteristics of the methods proposed in the present disclosure. In this disclosure, '/' means 'and', 'or', or 'and/or' depending on the context.

In the prior art, a base station may configure a UE-specific SPS configuration for a specific UE and allocate a repeated downlink SPS transmission resource according to a configured period. Here, DCI of a UE-specific PDCCH may indicate activation (SPS activation) of a specific SPS configuration index, and accordingly, the corresponding UE can repeatedly receive an SPS transmission resource according to a configured period. This SPS transmission resource is used for initial HARQ (hybrid automatic repeat request) transmission, and a base station may allocate a retransmission resource of a specific SPS configuration index through DCI of a UE-specific PDCCH. For example, when a UE reports a HARQ NACK for an SPS transmission resource, a base station can allocate a retransmission resource to DCI so that a UE can receive downlink retransmission. In addition, DCI of a UE-specific PDCCH may indicate deactivation (SPS release or SPS deactivation) of a specific SPS configuration index, and a UE receiving this does not receive the indicated SPS transmission resource. Here, a cyclic redundancy check (CRC) of DCI for activation/retransmission/deactivation of the SPS is scrambled with Configured Scheduling-RNTI (CS-RNTI).

Enhanced wireless communication system (e.g., Rel-17 NR system) intends to introduce a DL broadcast or DL multicast transmission method to support a Multicast Broadcast Service (MBS) service similar to LTE MBMS. A base station provides a point-to-multipoint (PTM) transmission method and/or a point-to-point (PTP) transmission method for DL broadcast or DL multicast transmission.

In a PTM transmission method for an MBS, a base station may configure common frequency resource (CFR). The base station transmits a group common PDCCH and a group common PDSCH to a plurality of UEs through the CFR, and a plurality of UEs simultaneously receive the same group common PDCCH and group common PDSCH transmission to decode the same MBS data.

On the other hand, in a PTP transmission scheme for an MBS, a base station transmits a UE-specific PDCCH and a UE-specific PDSCH to a specific UE, and only the corresponding UE receives the UE-specific PDCCH and the UE-specific PDSCH. Here, when there are a plurality of UEs receiving the same MBS service, a base station separately transmits the same MBS data to individual UEs through different UE-specific PDCCHs and UE-specific PDSCHs. That is, the same MBS data is provided to a plurality of UE, but different channels (i.e., PDCCH, PDCCH) are used for each UE.

As described above, in a PTM transmission method, a base station transmits a plurality of group common PDSCHs to a plurality of UEs. Here, a base station can receive UE's HARQ-ACKs for a group common PDSCH through a UE-specific PUCCH resource from a plurality of UEs.

Here, when a transport block (TB) for a multicast PDSCH (or group common PDSCH) is successfully decoded, a UE transmits an ACK as HARQ-ACK information. On the other hand, if a transport block (TB) is not successfully decoded, a UE transmits a NACK as HARQ-ACK information. This HARQ-ACK transmission method is referred to as an ACK/NACK based HARQ-ACK method (mode). In general, a UE may transmit an ACK/NACK based HARQ-ACK using a UE-specific PUCCH resource.

On the other hand, when a NACK only based HARQ-ACK method (mode) is configured for a multicast PDSCH (or group common PDSCH), a UE does not perform PUCCH transmission in case of an ACK and a UE perform PUCCH transmission in case of a NACK. Here, a PUCCH is a group common PUCCH resource, and only NACK can be transmitted as HARQ-ACK information. Hereinafter, in the present disclosure, a DCI format (or PDCCH) for scheduling reception of a PDSCH carrying an MBS service (i.e., MBS TB) may be referred to as an MBS DCI format (or PDCCH) or a multicast DCI format (or PDCCH). For example, a DCI format (or PDCCH) with a CRC scrambled by a G-RNTI (group-RNTI) or a G-CS-RNTI ((group-configured scheduling-RNTI) scheduling PDSCH reception may be referred to as an MBS DCI format (or PDCCH) or a multicast DCI format (or PDCCH). Here, unless otherwise described in the present disclosure, an MBS DCI format (or PDCCH) or a multicast DCI format (or PDCCH) may include both a group common DCI format (or PDCCH) according to a PTM method for an MBS and a UE specific DCI format (or PDCCH) according to a PTP method for an MBS.

In addition, unless otherwise described in the present disclosure (e.g., distinction between a PDSCH by dynamic scheduling and a PDSCH by SPS), a PDSCH scheduled by an MBS DCI format (or PDCCH) or a multicast DCI format (or PDCCH) (also, a PDSCH scheduled by UE specific DCI format (or PDCCH) of a PTP method) and a group common SPS PDSCH may be collectively referred to as an MBS PDSCH or a multicast PDSCH. In other words, unless otherwise described in the present disclosure, an MBS PDSCH or multicast PDSCH may include both a group common PDSCH according to a PTM method for an MBS and a UE specific PDSCH according to a PTP method for an MBS.

In addition, HARQ-ACK information associated with a multicast (or MBS) DCI format (or PDCCH) or multicast PDSCH may be referred to as MBS HARQ-ACK information or multicast HARQ-ACK information. Unless otherwise described in the present disclosure, such MBS HARQ-ACK information or multicast HARQ-ACK information may be transmitted through a UE specific PUCCH/PUSCH according to a PTP/PTM method or may be transmitted through a group common PUCCH/PUSCH according to a PTM method.

In addition, unless otherwise described in the present disclosure (e.g., distinction between a PDSCH by dynamic scheduling and a PDSCH by SPS), a PDSCH scheduled by a unicast DCI format (or PDCCH) and a UE-specific SPS PDSCH may be collectively referred to as a unicast/UE-specific PDSCH.

In addition, in the present disclosure, when a transport block (TB) for an MBS PDSCH or multicast PDSCH is successfully decoded, a UE may transmit an ACK as HARQ-ACK information. On the other hand, if a TB for an MBS PDSCH or multicast PDSCH is not successfully decoded, a UE may transmit a NACK as HARQ-ACK information. This HARQ-ACK transmission method is referred to as an ACK/NACK based HARQ-ACK method (mode).

On the other hand, if a TB for an MBS PDSCH or multicast PDSCH is successfully decoded, a UE may not transmit HARQ-ACK information (i.e., ACK) through a PUCCH (or PUSCH). On the other hand, if a TB for an MBS PDSCH or multicast PDSCH is not successfully decoded, a UE may transmit a NACK as HARQ-ACK information. This HARQ-ACK transmission method is referred to as an ACK/NACK based HARQ-ACK method (mode). In other words, when a NACK only based HARQ-ACK method (mode) is configured, a UE may not transmit a PUCCH (or PUSCH) in case of an ACK, and may transmit a PUCCH (or PUSCH) only in case of a NACK.

In addition, in the present disclosure, a sub-slot, a mini-slot, and a symbol slot all represent a time unit smaller than one slot, and unless clearly distinguished and described for each in the present disclosure, all may be interpreted in the same meaning. Also, all of the above terms may be regarded/interpreted as one or more symbols in a slot.

Figure 9:
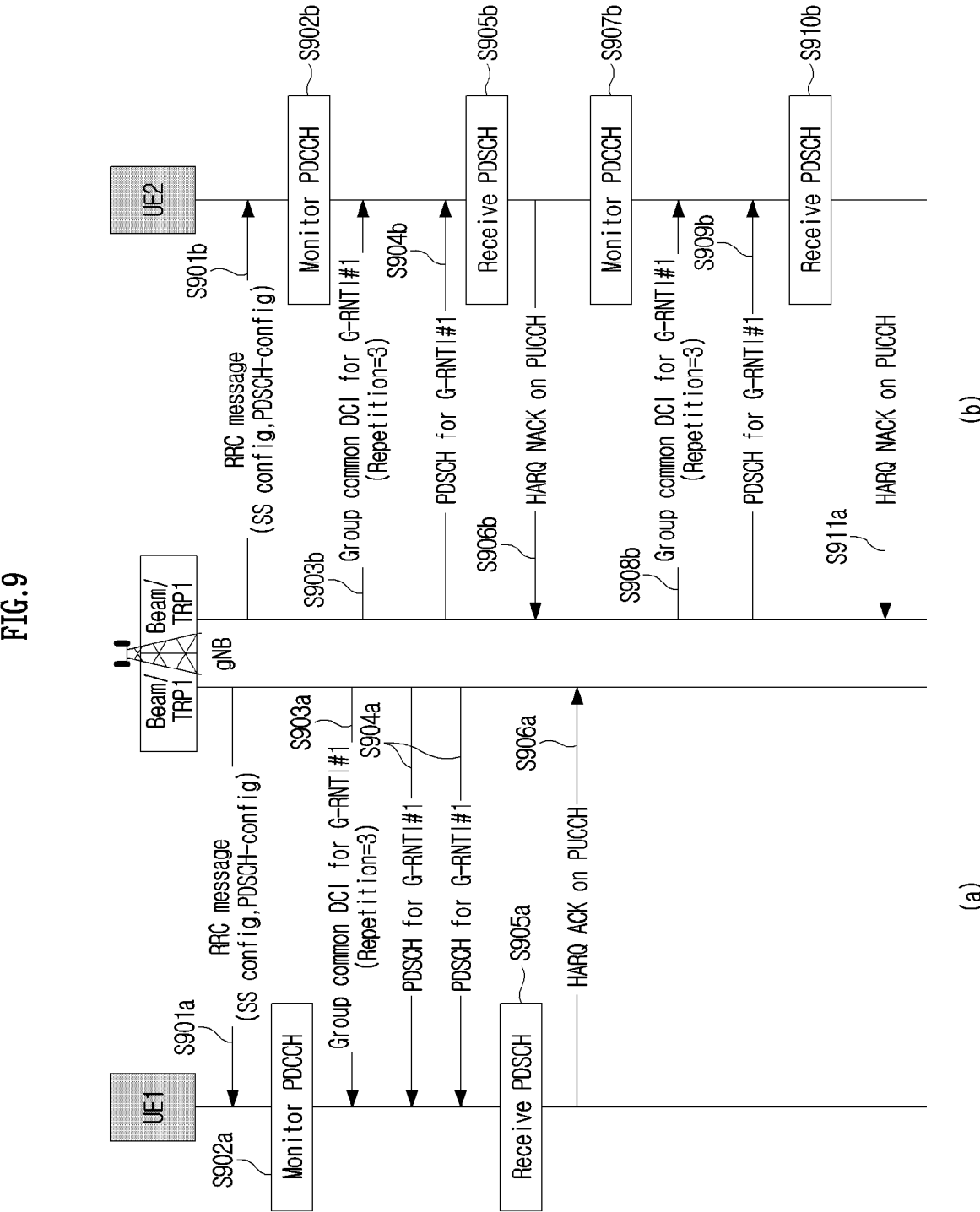
FIG. 9 illustrates a HARQ-ACK transmission and reception procedure for multicast PDSCH according to an embodiment of the present disclosure.

FIG. 9 illustrates a HARQ-ACK transmission and reception procedure for multicast PDSCH according to an embodiment of the present disclosure.

FIG. 9(a) illustrates a signaling procedure between UE1 and a base station (gNB) (beam/TRP 1), and FIG. 9(b) illustrates a signaling procedure between UE2 and a base station (gNB) (beam/TRP 2). In addition, FIG. 9(a) illustrates a case without PDSCH retransmission, and FIG. 9(b) illustrates a case with PDSCH retransmission. In FIG. 9, for convenience of description, two procedures are illustrated together, but the present disclosure is not limited thereto. That is, UE1 and UE2 are not limited to accessing the same base station (through different beams/TRPs), and are not limited to performing the two procedures together. In other words, although FIGS. 9(a) and 9(b) are separate procedures, they are shown together for convenience of explanation, and common descriptions are described for common steps.

1. Although not shown in FIG. 9, (before the procedure of FIG. 9), a UE may enter an RRC connected mode (RRC_CONNECTED mode) and may transmit a messages/information that indicates one or more MBS services of interest to a base station.

A. The message/information may be transmitted through any one of uplink control information (UCI), a MAC control element (CE), and an RRC message.

B. An interested MBS service in the message/information may mean either TMGI or G-RNTI included in a DL message received from a base station.

For example, the DL message may be a service availability message including TMGI #1, TMGI #3, TMGI #5 and TMGI #10. If a UE is interested in TMGI #5, the UE may indicate an order of TMGI #5 in the message/information. That is, the UE may report '3' to the base station.

As another example, the DL message may be a service availability message including G-RNTI #1, G-RNTI #3, G-RNTI #5 and G-RNTI #10. If a UE is interested in G-RNTI #10, the UE may indicate an order of G-RNTI #10 in the message/information. That is, the UE may report '4' to the base station.

2. Upon receiving the message/information, a base station may transmit at least one of i) a common frequency resource (CFR) configuration, ii) one or more group common PDSCH configurations including TCI states for one or more G-RNTI value(s), iii) a search space (SS) configuration including TCI states for one or more G-RNTI value(s) to the UE through an RRC message (S901*a*, S901*b*).

Although one RRC message is illustrated in FIG. 9, it is not limited thereto, and the configurations i) to iii) may be provided to a UE through different (or partially identical) RRC messages.

Upon receiving an RRC message from a base station, a UE may configure one or more group common PDSCH (e.g., group common SPS PDSCH) configurations according to the RRC message.

A. An RRC message may be a group common message transmitted on a PTM multicast control channel (MCCH) or a UE-specific message transmitted on a UE-specific dedicated control channel (DCCH).

B. A UE may be configured with at least a G-RNTI value for each MBS CFR or each serving cell. Alternatively, in addition to this, a GC-CS-RNTI (group common-configured scheduling-RNTI) may also be configured, and may be used for activating, retransmitting, or releasing one or more group common SPS configurations.

if a UE has not configured with a GC-CS-RNTI for a CFR or a serving cell, when a CS-RNTI has been configured for the CFR or the serving cell, the UE may use the CS-RNTI to activate, retransmit or release one or more group common SPS configurations.

A base station may associate a list of TMGIs or a list of G-RNTIs with one GC-CS-RNTI. In this case, a base station may provide a UE with a list of TMGIs or a list of G-RNTIs associated with the GC-CS-RNTI value.

C. Each PDSCH configuration (e.g., RRC parameter PDSCH-config) may include at least information elements (IE) for multicast and/or broadcast as shown in Table 6 below.

Table 6 illustrates the BDSCH-Config IE used to configure BDSCH parameters.

26

TABLE 6

```
PDSCH-Config ::= SEQUENCE {
dataScramblingIdentityPDSCH INTEGER (0..1023) OPTIONAL, --
Need S
dmrs-DownlinkForPDSCH-MappingTypeA SetupRelease {
DMRS-DownlinkConfig } OPTIONAL, -- Need M
dmrs-DownlinkForPDSCH-MappingTypeB SetupRelease {
DMRS-DownlinkConfig } OPTIONAL, -- Need M
tci-StatesToAddModList SEQUENCE (SIZE(1..maxNrofTCI-States )) OF
TCI-State OPTIONAL, -- Need N
tci-StatesToReleaseList SEQUENCE (SIZE(1..maxNrofTCI-States)) OF
TCI-StateId OPTIONAL, -- Need N
vrb-ToPRB-Interleaver ENUMERATED {n2, n4} OPTIONAL, -- Need S
resourceAllocation ENUMERATED { resourceAllocationType0,
resourceAllocationType1, dynamicSwitch},
pdsch-TimeDomainAllocationList SetupRelease { PDSCH-
TimeDomainResourceAllocationList } OPTIONAL, -- Need M
pdsch-AggregationFactor ENUMERATED { n2, n4, n8 } OPTIONAL, --
Need S
rateMatchPatternToAddModList SEQUENCE (SIZE
(1..maxNrofRateMatch Patterns)) OF RateMatchPattern OPTIONAL, --
Need N
rateMatchPatternToReleaseList SEQUENCE (SIZE
(1..maxNrofRateMatch Patterns)) OF RateMatchPatternId OPTIONAL, --
Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, --
Need S
maxNrofCodeWordsScheduledByDCI ENUMERATED {n1, n2}
...
}
```

Table 7 illustrates a description of the fields of the BDSCH-config of Table. 6 above.

TABLE 7

PDSCH-Config field descriptions dataScramblingIdentityPDSCH, dataScramblingIdentityPDSCH2
Identifier(s) used to initialize data scrambling (c_init) for
PDSCH. The dataScramblingIdentityPDSCH2 is configured if
coresetPoolIndex is configured with 1 for at least one
CORESET in the same BWP.
dmrs-Downlink ForPDSCH-MappingTypeA, dmrs-Downlink ForPDSCH-
MappingTypeA-DCI-1-2
DMRS configuration for PDSCH transmissions using PDSCH
mapping type A (chosen dynamically via PDSCH-
Time DomainResourceAllocation). Only the fields dmrs-Type,
dmrs-AdditionalPosition and maxLength may be set differently
for mapping type A and B. The field dmrs-DownlinkForPDSCH-
MappingTypeA applies to DCI format 1_1 and the field dmrs-
DownlinkForPDSCH-MappingTypeA-DCI-1-2 applies to DCI format
1_2.
dmrs-Downlink ForPDSCH-MappingTypeB, dmrs-Downlink ForPDSCH-
MappingTypeB-DCI-1-2
DMRS configuration for PDSCH transmissions using PDSCH
mapping type B (chosen dynamically via PDSCH-
Time DomainResourceAllocation). Only the fields dmrs-Type,
dmrs-AdditionalPosition and maxLength may be set differently
for mapping type A and B. The field dmrs-DownlinkForPDSCH-
MappingTypeB applies to DCI format 1_1 and the field dmrs-
DownlinkForPDSCH-MappingTypeB-DCI-1-2 applies to DCI format
1_2.
maxNrofCodeWordsScheduledByDCI
Maximum number of code words that a single DCI may schedule.
This changes the number of MCS/RV/NDI bits in the DCI message
from 1 to 2.
mcs-Table, mcs-TableDCI-1-2
Indicates which MCS table the UE shall use for PDSCH. If the
field is absent the UE applies the value 64QAM. The field
mcs-Table applies to DCI format 1_0 and DCI format 1_1, and
the field mcs-TableDCI-1-2 applies to DCI format 1_2.
pdsch-AggregationFactor
Number of repetitions for data. When the field is absent the
UE applies the value 1.
pdsch-TimeDomainAllocationList, pdsch- TABLE 7-continued PDSCH-Config field descriptions Time DomainAllocationListDCI-1-2
List of time-domain configurations for timing of DL
assignment to DL data.
The field pdsch-TimeDomainAllocationList (with or without
suffix) applies to DCI format 1_0 and DCI format 1_1, and if
the field pdsch-TimeDomainAllocationListDCI-1-2 is not
configured, to DCI format 1_2. If the field pdsch-
TimeDomainAllocationListDCI-1-2 is configured, it applies to
DCI format 1_2.
The network does not configure the pdsch-
TimeDomainAllocationList-r16 simultaneously with the pdsch-
TimeDomainAllocationList (without suffix) in the same PDSCH-
Config.
rateMatch PatternGroup1, rateMatchPatternGroup1DCI-1-2
The IDs of a first group of RateMatchPatterns defined in
PDSCH-Config->rateMatchPatternToAddModList (BWP level) or in
ServingCellConfig ->rateMatchPatternToAddModList (cell
level). These patterns can be activated dynamically by DCI.
The field rateMatchPatternGroup1 applies to DCI format 1_1,
and the field rateMatchPatternGroup1DCI-1-2 applies to DCI
format 1_2.
rateMatchPatternGroup2, rateMatch PatternGroup2DCI-1-2
The IDs of a second group of RateMatchPatterns defined in
PDSCH-Config->rateMatchPatternToAddModList (BWP level) or in
ServingCellConfig ->rateMatchPatternToAddModList (cell
level). These patterns can be activated dynamically by DCI.
The field rateMatchPatternGroup2 applies to DCI format 1_1,
and the field rateMatchPatternGroup2DCI-1-2 applies to DCI
format 1_2.
rateMatchPatternToAddModList
Resources patterns which the UE should rate match PDSCH
around. The UE rate matches around the union of all resources
indicated in the rate match patterns.
rbg-Size
Selection between config 1 and config 2 for RBG size for
PDSCH. The UE ignores this field if resourceAllocation is set
to resourceAllocationType1.
resourceAllocation, resourceAllocationDCI-1-2
Configuration of resource allocation type 0 and resource
allocation type 1 for non-fallback DCI. The field
resourceAllocation applies to DCI format 1 1, and the field
resourceAllocationDCI-1-2 applies to DCI format 1 2.
resourceAllocationType1 GranularityDCI-1-2
Configure the scheduling granularity applicable for both the
starting point and length indication for resource allocation
type 1 in DCI format 1_2. If this field is absent, the
granularity is 1 PRB.
tci-StatesToAddModList
A list of Transmission Configuration Indicator (TCI) states
indicating a transmission configuration which includes QCL-
relationships between the DL RSs in one RS set and the PDSCH
DMRS ports.
vrb-ToPRB-Interleaver, vrb-ToPRB-InterleaverDCI-1-2
Interleaving unit configurable between 2 and 4 PRBs. When the
field is absent, the UE performs non-interleaved VRB-to-PRB
mapping.

3. When a search space (SS) for a configured CFR is configured, a UE monitors a PDCCH on the SS configured in the CFR configured to receive DCI with a CRC scrambled with a G-RNTI or a G-CS-RNTI (S902a, S902b).

4. If a data unit is available in a Multicast Traffic Channel (MTCH) of an MBS radio bearer (MRB) for an MBS service, according to a service-to-resource mapping, a base station constructs and transmits a transport block (TB) including a data unit for an SPS PDSCH occasion, i) associated with an MTCH of an MRB for an MBS service, ii) associated with a TMGI of an MBS service, iii) associated with a short ID of an MBS service, or iv) associated with a G-RNTI mapped to an MBS service.

In the case of group common dynamic scheduling of a TB, a base station transmits DCI to a UE on a PDCCH (S903a, S903b).

Here, a CRC of the DCI may be scrambled by a G-RNTI, a G-CS-RNTI or a CS-RNTI. Also, a PDCCH may be a group common PDCCH or a UE specific PDCCH.

In FIG. 9, a case in which a group common DCI with a CRC scrambled with G-RNTI #1 is transmitted, and repetition=3 is exemplified.

The DCI may include the following information (fields).

Identifier for DCI format: This information (field) may indicate either an MBS-specific DCI format or one of an existing DCI format for an MBS.

Carrier indicator: This information (field) indicates a (serving or MBS specific) cell of a CFR through which a group common PDCCH/PDSCH is transmitted or a serving cell of an active BWP of a UE associated with the CFR.

Bandwidth part indicator: This information (field) indicates a BWP ID assigned to a CFR through which a group common PDCCH/PDSCH is transmitted or a BWP ID of an active BWP of a UE associated with the CFR.

In addition, the DCI may include information on a frequency domain resource assignment, a time domain resource assignment, a VRB-to-PRB mapping, and a PRB bundling size indicator, a rate matching indicator, a ZP CSI-RS trigger, a modulation and coding scheme, a new data indicator (NDI), a redundancy version, a HARQ process number, a downlink assignment index, a transmit power control (TPC) command for a scheduled PUCCH, a PUCCH resource Indicator (PRI), a PDSCH-to-HARQ_feedback timing indicator (PDSCH-to-HARQ_feedback timing indicator), antenna port(s), a transmission configuration indication (TCI), an SRS request, a DMRS sequence initialization, and a priority indicator.

In the case of group common dynamic scheduling, a base station may provide a UE with one or more of the following service-to-resource mappings for an MBS service identified by a TMGI or a G-RNTI or a GC-CS-RNTI i) by a group common or UE-specific RRC message or ii) by a group common or UE-specific MAC CE. Data of an MBS service can be carried over an MBS radio bearer (MRB) of an MTCH associated with an MBS service, which is a multicast traffic logical channel. An RRC message may be a group common message transmitted through a PTM Multicast Control Channel (MCCH) or a UE-specific message transmitted through a UE-specific Dedicated Control Channel (DCCH). DCI scheduling a PDSCH carrying MBS service data may also indicate one or more of a short ID, an MTCH ID, an MRB ID, a G-RNTI value, and a TMGI value for an MBS service.

5. If a UE receives DCI with a CRC scrambled by a G-RNTI of interest in receiving, based on i) a mapping between MBS services and a HARQ process number (HPN) indicated in DCI and/or ii) (if available) a mapping between MBS services and an indicated short ID(s) in DCI, a UE may determine an MBS service related to one or more of short ID, MTCH ID, MRB ID, G-RNTI value, and TMGI value for each PDSCH occasion.

A base station may transmit a PDSCH carrying corresponding MBS service data to a UE (S904a, S904b) (In FIG. 9, the case where MBS service data mapped with G-RNTI #1 is transmitted is exemplified), and if a UE is interested in the determined MBS service (s), the UE can receive PDSCH transmission scheduled by DCI (S905a, S905b).

On the other hand, different from the example of FIG. 9, if a UE is not interested in the determined MBS service(s), the UE may not receive PDSCH transmission scheduled by DCI.

Then, according to the decoding state of PDSCH transmission, a UE transmits HARQ feedback to a base station.

6. A UE receiving group common DCI indicating PUCCH resource(s) for an MBS HARQ-ACK may transmit a HARQ-ACK to a base station through a PUCCH after receiving a PDSCH scheduled by DCI as follows (S906a).

A. In the case of PTM method 1, group common DCI may indicate a single PUCCH resource indicator (PRI) and a single PDSCH-to-HARQ_feedback timing indicator (K1) for at least an ACK/NACK based HARQ-ACK.

B. In case of UE-specific PUCCH resource allocation for an ACK/NACK based HARQ-ACK for group common DCI, different UEs in a group can be configured with different values of at least of a PUCCH resource and a candidate DL data-UL ACK (e.g., dl-DataToUL-ACK) in a UE-dedicated PUCCH configuration (e.g., PUCCH-config) for multicast or unicast (if PUCCH-config for multicast is not configured).

Different PUCCH resources may be allocated to different UEs by the same PUCCH resource indicator (PRI) and the same PDSCH-to-HARQ feedback timing indicator (K1) of group common DCI.

C. In case of PTP retransmission, in UE-specific DCI, a PUCCH resource indicator (PRI) and a PDSCH-to-HARQ_feedback timing indicator (K1) can be interpreted based on a PUCCH configuration (e.g. PUCCH-config) for unicast regardless of whether or not a PUCCH configuration (e.g. PUCCH-config) for multicast is configured.

D. A PUCCH Resource Indicator (PRI) may be indicated by group common DCI as follows.

1) Option 1A-1: A list of UE specific PRIs may be included in DCI.

Each PRI in a list may indicate an entry corresponding to a candidate PUCCH resource ID (e.g., pucch-ResourceId) value in a PUCCH configuration (e.g. PUCCH-config) for the same PUCCH resource or different PUCCH resource allocation for other UEs of a group receiving the same DCI. Other PRIs of DCI may indicate different entries in a PUCCH configuration (e.g., PUCCH-config).

A candidate PUCCH resource ID (e.g., pucch-ResourceId) value is configured by a higher layer (e.g., RRC), at least in multicast PUCCH configuration (e.g., PUCCH-config), different PUCCH resource ID (e.g., pucch-ResourceId) values may be configured for different UEs of the same group.

2) Option 1A-2: group common PRI may be included in DCI.

A single group common PRI may indicate a corresponding entry for a candidate PUCCH resource ID (e.g., pucch-ResourceId) value in a UE specific PUCCH configuration (e.g., PUCCH-config) for the same or different PUCCH resource allocation for all UEs in a group.

A candidate PUCCH resource ID (e.g., pucch-ResourceId) value is configured by a higher layer (e.g., RRC), at least in PUCCH configuration for multicast (e.g., PUCCH-config), different PUCCH resource ID (e.g., pucch-ResourceId) values may be configured for different UEs of the same group.

When a PUCCH configuration (e.g., PUCCH-config) for multicast is configured for a HARQ-ACK for a group common PDSCH scheduled by group common DCI, a UE may assume that a PRI of group common DCI indicates a corresponding entry for a candidate PUCCH resource ID (pucch-ResourceId) value in a PUCCH configuration (e.g., PUCCH-config) for multicast. That is, a PRI value of group common DCI may be interpreted based on a PUCCH configuration (e.g., PUCCH-config) for multicast.

On the other hand, when a PUCCH configuration for multicast (e.g., PUCCH-config) is not configured for a HARQ-ACK for a group common PDSCH scheduled by group common DCI, a UE may assume that a PRI of group common DCI indicates a corresponding entry for a candidate PUCCH resource ID (pucch-ResourceId) value in a PUCCH configuration (e.g., PUCCH-config) for unicast. That is, a PRI value of group common DCI may be interpreted based on a PUCCH configuration (e.g., PUCCH-config) for unicast.

E. K1 (PDSCH-to-HARQ_feedback timing indicator) may be indicated by group common DCI as follows.

1) Option 1B-1: A list of UE specific K1 values may be included in DCI.

Each K1 in a list may indicate the same UL slot or different UL (sub)slots for other UEs in a group.

As an example, different K1 values may be assigned to different UEs. For example, K1-UE1, K2-UE2, K3-UE3, . . . .

As another example, a K1 value may be shared by multiple UEs (e.g., K1-UE1/UE2, K2-UE3/UE4).

As another example, one K1 value may be a reference and other K1 values may be assigned based on the reference. For example, a list of {K1_ref, K1_offset (offset from reference)} may be indicated in DCI.

For example, UE1 may use K1 ref, UE2 may use K1 ref+K1_offest1, and UE3 may use K1_ref+K1_offest2.

2) Option 1B-2: A group common K1 value may be included in DCI.

A single K1 value may indicate a corresponding entry for a candidate DL data-UL ACK value (e.g., dl-DataToUL-ACK) in a UE specific PUCCH configuration (e.g., PUCCH-config) for the same or different PUCCH resource allocation for all UEs of a group receiving DCI. This can be applied when a DCI format of DCI is configured in a UE specific PUCCH configuration (e.g., PUCCH-config) for a K1 value.

A candidate DL data-UL ACK value (e.g., dl-DataToUL-ACK) is configured by a higher layer (e.g., RRC), at least the PUCCH configuration for multicast (e.g., PUCCH-config) can be different for different UEs in the same group.

When a PUCCH configuration (e.g., PUCCH-config) for multicast is configured for a HARQ-ACK for a group common PDSCH scheduled by group common DCI, a UE may assume that a K1 value of group common DCI indicates a corresponding entry for a candidate DL data-UL ACK value (e.g., dl-DataToUL-ACK) in a PUCCH configuration (e.g., PUCCH-config) for multicast. That is, a K1 value of group common DCI may be interpreted based on a PUCCH configuration (e.g., PUCCH-config) for multicast.

On the other hand, when a PUCCH configuration for multicast (e.g., PUCCH-config) is not configured for a HARQ-ACK for a group common PDSCH scheduled by group common DCI, a UE may assume that a K1 value of group common DCI indicates a corresponding entry for a candidate DL data-UL ACK value (e.g., dl-DataToUL-ACK) in a PUCCH configuration (e.g., PUCCH-config) for unicast. That is, a K1 value of group common DCI may be interpreted based on a PUCCH configuration (e.g., PUCCH-config) for unicast.

In addition, when receiving group common DCI with a CRC scrambled by a G-RNTI and/or UE specific DCI with a CRC scrambled by a C-RNTI, when a Type-1 HARQ-ACK codebook for a PUCCH-config for multicast and/or a PUCCH-config for unicast is configured, a UE may configure Time Domain Resource Allocation (TDRA) to generate a type 1 HARQ-ACK codebook for HARQ-ACK(s) for a group common PDSCH scheduled by group common DCI and/or a UE specific PDSCH scheduled by UE specific DCI.

7. If decoding of a TB on a PDSCH transmission occasion fails, a UE may transmit a HARQ NACK to a base station on a PUCCH resources in a configured UL CFR (S906*b*).

By using a PUCCH resource, a UE may also transmit a HARQ-ACK for other PDSCH transmissions such as a unicast SPS PDSCH, a dynamic unicast PDSCH, PTP retransmission, and/or a dynamic group common PDSCH. In this case, to multiplex a HARQ-ACK on a PUCCH in a (sub)slot for an SPS PDSCH for multicast, an SPS PDSCH for unicast, a dynamically scheduled multicast PDSCH, and/or a dynamically scheduled unicast PDSCH, a UE may construct a codebook based on one or more options in step 7 above.

If a reference signal received power (RSRP) threshold is configured, a UE may use a NACK only based HARQ-ACK based on a measured RSRP of a serving cell. For example, if the measured RSRP is higher than (or equal to or higher than) the threshold value, a NACK only based HARQ-ACK may be transmitted through a group common PUCCH resource indicated by a PRI of DCI. On the other hand, if the measured RSRP is lower than (or equal to or less than) the threshold, a NACK only based HARQ-ACK may be changed to a HARQ-ACK based HARQ-ACK and transmitted through a UE-specific PUCCH resource indicated by a PRI of DCI.

Meanwhile, if a PDSCH aggregation factor (pdsch-AggregationFactor) is configured for a G-RNTI or a base station indicates a repetition number (repeat_number) in DCI, a TB scheduled by group common DCI may be repeated for the Nth HARQ transmission of a TB within each symbol allocation among each PDSCH aggregation factor (pdsch-AggregationFactor) consecutive slots or among each repetition number (repeat_number) consecutive slots.

8. A base station receiving a HARQ NACK with a TCI state may retransmit a PDCCH and a PDSCH with a TCI state in a DL CFR configured for TB retransmission. A UE may monitor a group common and/or UE-specific PDCCH with a TCI state on a search space configured in a DL CFR to receive TB retransmission (S907*b*).

A base station may retransmit a TB to only one of UEs in a group by a UE-specific PDCCH, and other UEs may not receive retransmission of a TB (e.g., because the other UEs successfully received the TB).

9. When a UE receives a PDCCH for retransmission of a TB (S908*b*), a UE may receive a PDSCH scheduled by DCI of a PDCCH (S909*b*, S910*b*).

If a UE successfully decodes a TB on a PDSCH, based on a mapping between an MBS service indicated by DCI and an HPN (HARQ process number) and/or between an MBS service indicated by DCI and a short ID(s) (if available), the UE may consider that the decoded TB is associated with an MTCH, an MRB, a TMGI, a G-RNTI and/or a short ID of an MBS service.

10. If decoding of a TB succeeds in a PDSCH transmission occasion, a UE may transmit a HARQ ACK to a base station through a PUCCH resource in a UL CFR configured according to step 7. On the other hand, if decoding of a TB on a PDSCH transmission occasion fails, a UE may transmit a HARQ NACK to a base station on a PUCCH resource in a configured UL CFR (S911*b*).

By using a PUCCH resource, a UE may also transmit HARQ-ACKs for other PDSCH transmissions such as a unicast SPS PDSCH, a dynamic unicast PDSCH, PTP retransmission, and/or a dynamic group common PDSCH. In this case, to multiplex HARQ-ACKs on a PUCCH in a (sub)slot for an SPS PDSCH for multicast, an SPS PDSCH for unicast, a dynamically scheduled multicast PDSCH, and/or a dynamically scheduled unicast PDSCH, a UE may construct a codebook based on one or more options in step 7 above.

Meanwhile, an example of FIG. 9 is for convenience of description and does not limit the scope of the present disclosure. Some step(s) illustrated in FIG. 9 may be omitted depending on circumstances and/or settings. In addition, a base station and a UE in FIG. 9 are just one example, and may be implemented as the device illustrated in FIG. 13 below. For example, the processor (102/202) of FIG. 13 can control to transmit and receive channels/signals/data/information, etc. using the transceiver (106/206) and can also control to store transmitted or received channels/signals/information/data/information, etc. in the memory (104/204).

A base station may be a general term for an object that transmits and receives data with a terminal. For example, a base station may be a concept including one or more transmission points (TPs), one or more transmission and reception points (TRPs), etc. Also, a TP and/or a TRP may include a panel of a base station, a transmission and reception unit, etc. In addition, "TRP" may be replaced with expressions such as a panel, an antenna array, a cell (e.g., macro cell/small cell/pico cell, etc.)/a TP (transmission point), base station (base station, gNB, etc.), etc. As described above, TRPs may be classified according to information (e.g., index, ID) on a CORESET group (or CORESET pool). For example, when one UE is configured to transmit/receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

Referring to FIG. 9, signaling between one base station and a UE is considered for convenience of explanation, but the corresponding signaling scheme can be extended and applied to signaling between multiple TRPs and multiple UEs. Alternatively, a base station may include a plurality of TRPs, or may be one cell including a plurality of TRPs.

In relation to group common PDSCH transmission and HARQ-ACK transmission operation therefor as described above, unicast HARQ-ACK, group common HARQ-ACK, and/or scheduling request (SR) having the same/different priorities may be allocated to the same UL slot.

Here, the unicast HARQ-ACK may correspond to HARQ-ACK information for reception of a unicast PDSCH, and the group common HARQ-ACK may correspond to HARQ-ACK information for reception of a group common PDSCH.

Additionally, the terminal may configure/receive up to 8 SPS configurations, and each SPS configuration may be configured to have a unique SPS configuration index. The base station may allocate/configure some of the eight SPS configurations for unicast SPS PDSCH transmission, and allocate/configure other portions for group common SPS PDSCH transmission. In this case, the UE may receive the group common SPS PDSCH based on the PTM transmission method. That is, a plurality of UEs in a group may receive a group common SPS PDSCH.

Hereinafter, in the present disclosure, a multicast scheme among group common types is described as a representative example for clarity of explanation. Therefore, the proposals in this disclosure are not excluded from common groups of other cast types, and may be extended and applied to them.

At this time, the UE may transmit HARQ-ACK for the SPS PDSCH for each SPS configuration. To this end, the UE may configure/receive PUCCH resources for performing corresponding HARQ-ACK transmission through higher layer messages (e.g., RRC messages, etc.) for each SPS configuration.

In this regard, in an existing wireless communication system, HARQ-ACK deferral for SPS PDSCH may be supported through the following method/operation.

For a UE receiving multicast SPS PDSCH of a SPS configuration, the base station (e.g., gNB) may configure/ provide SPS HARQ deferral (e.g., spsHARQdeferral) for each SPS configuration, i.e., per SPS configuration index (e.g., SPS-configIndex) in SPS configuration (e.g., SPS-Config) of a RRC message.

Table 8 illustrates SPS configuration related to SPS HARQ delay.

TABLE 8

```
SPS-Config ::= SEQUENCE { →
periodicity ENUMERATED {ms10, ms20, ms32, ms40, ms64,
ms80, ms128, ms160, ms320, ms640, spare6, spare5,
spare4, spare3, spare2, spare1},
nrofHARQ-Processes INTEGER (1..8),
n1PUCCH-AN PUCCH-ResourceId OPTIONAL, -- Need M
mcs-Table ENUMERATED {qam64LowSE} OPTIONAL, -- Need S
...
[[
sps-ConfigIndex-r16 SPS-ConfigIndex-r16 OPTIONAL, --
Cond SPS-List
harq-ProcID-Offset-r16 INTEGER (0..15) OPTIONAL, --
Need R
periodicityExt-r16 INTEGER (1..5120) OPTIONAL, --
Need R
harq-CodebookID-r16 INTEGER (1..2) OPTIONAL, -- Need
R
pdsch-AggregationFactor-r16 ENUMERATED {n1, n2, n4,
n8 } OPTIONAL -- Need S
]],
[[
sps-HARQ-Deferral-r17 INTEGER (1..32) OPTIONAL,
Need R
n1PUCCH-AN-PUCCHsSCell-r17 PUCCH-ResourceId OPTIONAL,
-- Need R
periodicityExt-r17 INTEGER (1..40960) OPTIONAL, --
Need R
nrofHARQ-ProcessesExt-r17 INTEGER (9..32) OPTIONAL, --
Need R
harq-ProcID-Offset-v1700 INTEGER (16. . 31) OPTIONAL
Need R
}
```

In Table 8, sps-HARQ-Deferral indicates the maximum number of slots or subslots the transmission of DL SPS HARQ-ACK in a slot or subslot may be deferred. n1PUCCH-AN indicates HARQ resources for PUCCH for DL SPS.

In this regard, the base station/network may configure/ provide resources as format 0 or format 1. Actual PUCCH-Resource is configured/provided in PUCCH-Config and may be referred to by its ID.

The base station may transmit a unicast DCI format of which the CRC is scrambled by the CS-RNTI to activate the unicast SPS PDSCH for a first SPS configuration index (e.g., first SPS-ConfigIndex). Additionally, the base station may transmit a multicast DCI format of which the CRC is scrambled by the G-CS-RNTI to activate the multicast SPS PDSCH for a second SPS configuration index (e.g., secind SPS-ConfigIndex).

When the UE is provided with SPS HARQ deferral (e.g., spsHARQdeferral), after performing a UCI reporting/UCI multiplexing procedure (e.g., refer to 3GPP TS 38.213 clause 9/9.2.5) to resolve overlapping among PUCCH(s) and PUSCH(s) in a first slot, the UE may determine a PUCCH resource for PUCCH transmission with the first HARQ-ACK information bit for SPS PDSCH reception(s) to be reported by the corresponding UE for a first time.

Here, the corresponding PUCCH resource is provided by the SPS-PUCCH-AN-List of the RRC message (e.g., refer to 3GPP TS 38.213 clause 9.2.1), or by the n1PUCCH-AN if the SPS-PUCCH-AN-List is not provided. Additionally, the corresponding PUCCH resource is not canceled by overlapping PUCCH or PUSCH transmission of a higher priority index. Additionally, the corresponding PUCCH resource may be indicated as downlink by tdd-UL-DL-ConfigurationCommon or tdd-UL-DL-ConfigDedicated, be indicated for SS/PBCH block by ssb-PositionInBurst, or be overlapped with symbols belonging to CORESET associated with Type0-PDCCH CSS set.

The UE may perform HARQ-ACK deferral for the unicast SPS PDSCH as follows.

First, the UE may determine an earliest second slot. After performing the UCI reporting/UCI multiplexing procedure (e.g., refer to 3GPP TS 38.213 clause 9/9.2.5) to resolve the overlapping among PUCCH(s) and PUSCH(s), if any, the PUSCH or PUCCH of the earliest second slot may be determined to multiplex HARQ-ACK information bits including the second HARQ-ACK information bits from the first HARQ-ACK information bits.

In this regard, when the UE detects a DCI format in PDCCH reception triggering PUCCH transmission with a Type-3 HARQ-ACK codebook in a slot (e.g., refer to 3GPP TS 38.213 clause 9.1.4), the UE may stop the above-described procedure to determine the earliest second slot in the corresponding slot.

Additionally or alternatively, when the UE is provided a periodic cell switching pattern for PUCCH transmission by pucch-sCellPattern, the UE may determine the earliest second slot and the corresponding cell based on a periodic cell switching pattern (e.g., refer to 3GPP TS 38.213 clause 9.A).

Additionally or alternatively, a case of in which the UE multiplexes the second HARQ-ACK information in a PUSCH, or in a PUCCH using a resource that is not from SPS-PUCCH-AN-List, or from n1PUCCH-AN if SPS-PUCCH-AN-List is not provided may be considered. In this case, the UE may stop the above-described procedure to determine the earliest second slot in the corresponding slot.

Additionally or alternatively, a case of in which the UE multiplexes the seoncd HARQ-ACK information in the first PUCH having lower priority index and drops the first PUCCH transmission due to an overlapping with a second PUSCH or PUCCH transmission of higher priority index may be considered. Here, the first PUCCH corresponds to a PUCCH using resources provided by SPS-PUCCH-AN-List or n1PUCCH-AN if SPS-PUCCH-AN-List is not provided. In this case, the UE may stop the above-described procedure to determine the earliest second slot in the corresponding slot.

Next, the second HARQ-ACK information bits may correspond to SPS PDSCH configurations with spsHARQdeferral values that are larger than or equal to a time difference, with reference to slots for PUCCH transmissions on the primary cell, between the second slot and the slot of the SPS PDSCH reception In this regard, a case in which the UE multiplexes the second HARQ-ACK information in the first PUCCH and does not drop the first PUCCH transmission due to an overlapping with a PUSCH or PUCCH transmission having a higher priority index may be considered. In here, the first PUCCH corresponds to a PUCCH using resources provided by SPS-PUCCH-AN-List or n1PUCCH-AN if SPS-PUCCH-AN-List is not provided. Corresponding PUCCH transmission is indicated as downlink by tdd-UL-DL-ConfigurationCommon or tdd-UL-DL-ConfigDedicated, is indicated for SS/PBCH block by ssb-PositionInBurst, or does not include any symbols belonging to the CORESET associated with the Type0-PDCCH CSS set. In this case, the UE may stop the above-described procedure to determine the earliest second slot in the corresponding slot.

Next, the second HARQ-ACK information bits (e.g., refer to 3GPP TS 38.213 clause 9.1.2) may be appended in the HARQ-ACK codebook generated by the UE (e.g., 3GPP TS 38.213 clause 9.1.2/9.1.2.1/9.1.3.1/9.1.5).

In this regard, when the UE receives a PDSCH providing a TB for the same HARQ process as the HARQ-ACK information bit from the second HARQ-ACK information bits prior to transmitting the PUCCH or PUSCH, the UE may not include the corresponding HARQ-ACK information bits in the HARQ-ACK information bits.

Regarding the above scheme, the UE may not expect to provide both spsHARQdeferral and nrofSlots (or PUCCH-nrofSlots) for any PUCCH resource of the same priority.

However, the HARQ-ACK deferral method for the SPS PDSCH defined in the existing wireless communication system as described above may be applied only when a unicast SPS is configured.

In the present disclosure, for clarity of explanation, a SPS for semi-persistent unicast PDSCH transmission and reception is referred to as a unicast SPS, An SPS for semi-persistent multicast PDSCH transmission and reception is referred to as a multicast SPS. Additionally, the delay of HARQ-ACK for SPS PDSCH is referred to as SPS HARQ deferral.

The SPS HARQ deferral method defined in the existing wireless communication system as described above has an unclear problem in terms of operation when only a multicast SPS is configured or when both a unicast SPS and a multicast SPS are configured.

Additionally, the corresponding SPS HARQ deferral method has an unclear problem in terms of operation even when NACK-only based HARQ-ACK is configured for SPS.

Therefore, the present disclosure proposes a method of performing an SPS HARQ deferral or performing a corresponding HARQ-ACK drop in consideration of the above-described case.

Figure 10:
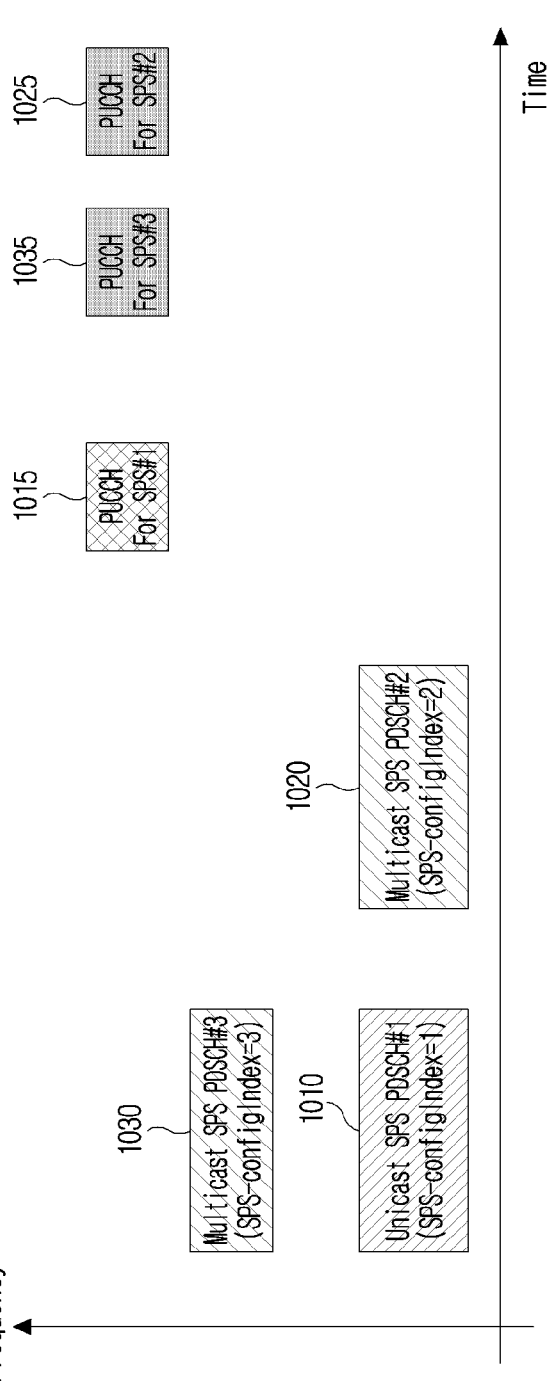
FIG. 10 illustrates unicast/multicast SPS PDSCH transmission and HARQ-ACK reporting for this in a wireless communication system to which the present disclosure may be applied.

FIG. 10 illustrates unicast/multicast SPS PDSCH transmission and a HARQ-ACK report for it in a wireless communication system to which the present disclosure may be applied.

Referring to FIG. 10, (in the same cell/BWP), a UE may receive (both) a unicast SPS PDSCH and a multicast SPS PDSCH transmitted through FDM or TDM.

For example, multiple SPS configurations having different SPS configuration indices (e.g., SPS-configIndex) may be activated for the UE.

As shown in FIG. 10, the UE may receive a unicast SPS PDSCH occasion 1010 for SPS-configIndex=1 and a multicast SPS PDSCH occasion 1020 for SPS-configIndex=2 through the TDM scheme. Additionally, the UE may receive a unicast SPS PDSCH occasion 1010 for SPS-configIndex=1 and a multicast SPS PDSCH occasion 1030 for SPS-configIndex=3 through the FDM scheme.

When the UE receives one or more unicast SPS PDSCHs and one or more multicast SPS PDSCHs (for G-RNTI #1/G-RNTI #2), PUCCH 1015 for HARQ-ACK transmission for unicast SPS PDSCH and PUCCH 1025/1035 for HARQ-ACK transmission for multicast SPS PDSCH may be indicated/allocated to transmission in the same or different UL slots.

In this regard, the present disclosure proposes methods of performing a SPS HARQ deferral for a multicast SPS or dropping a corresponding HARQ-ACK.

Embodiment 1

This embodiment relates to a method of performing SPS HARQ deferral/drop when a NACK-only based HARQ-ACK scheme is configured for multicast SPS.

For example, a NACK-only based HARQ-ACK scheme may be configured for a specific SPS configuration for multicast SPS purposes having a specific SPS configuration index (e.g., sps-ConfigIndex).

In this case, SPS HARQ deferral/drop may be performed based on one or more of the following methods.
(Method 1-1)

A method that NACK-only based HARQ-ACK for the SPS configuration index of multicast SPS does not support the SPS HARQ deferral may be considered.

In this regard, the UE may expect that NACK only based HARQ-ACK for the SPS configuration index of multicast SPS may not be configured with SPS HARQ deferral.

Alternatively, a case in which NACK-only based HARQ-ACK for the SPS configuration index of multicast SPS is configured with SPS HARQ deferral, and a case in which the UE would be transmitting SPS HARQ-ACK using a HARQ-ACK PUCCH resource (e.g., n1PUCCH-AN or PUCCH SPS-PUCCH-AN-List-r16) which is not valid may be considered. In this case, the corresponding UE may not defer NACK-only based HARQ-ACK for the multicast SPS PDSCH, and so the UE may drop NACK-only based HARQ-ACK for the multicast SPS PDSCH.

Additionally, a case in which ACK/NACK based HARQ-ACK for the SPS configuration index of multicast SPS is configured with SPS HARQ deferral, and a case in which the UE would be transmitting SPS HARQ-ACK using a HARQ-ACK PUCCH resource (e.g., n1PUCCH-AN or PUCCH SPS-PUCCH-AN-List-r16) which is not valid may be considered. In this case, the UE may defer the HARQ-ACK to multicast SPS PDSCH to the target PUCCH slot.
(Method 1-2)

A method of transforming NACK-only based HARQ-ACK for multicast SPS to ACK/NACK based HARQ-ACK for deferred HARQ-ACK for multicast SPS may be considered.

For example, a case in which NACK-only based HARQ-ACK for the SPS configuration index of multicast SPS is configured with SPS HARQ deferral, and a case in which the UE would be transmitting SPS HARQ-ACK using a HARQ-ACK PUCCH resource (e.g., n1PUCCH-AN or PUCCH SPS-PUCCH-AN-List-r16) which is not valid may be considered. In this case, regardless of whether the SPS HARQ deferral is configured for unicast SPS, the UE may transform the NACK-only based HARQ-ACK into ACK/NACK based HARQ-ACK and then may defer the HARQ-ACK to multicast SPS PDSCH to the target PUCCH slot.

Additionally, a case in which ACK/NACK based HARQ-ACK for the SPS configuration index of multicast SPS is configured with SPS HARQ deferral, and a case in which the UE would be transmitting SPS HARQ-ACK using a HARQ-ACK PUCCH resource (e.g., n1PUCCH-AN or PUCCH SPS-PUCCH-AN-List-r16) which is not valid may be considered. In this case, the UE may defer the HARQ-ACK to multicast SPS PDSCH to the target PUCCH slot.

For another example, the SPS HARQ deferral may be configured for a first SPS configuration of a unicast SPS or multicast SPS configured with ACK/NACK-based HARQ-ACK (i.e., SPS configuration based on the first SPS configuration index). At this time, a case in which NACK-only based HARQ-ACK for the second SPS configuration index of multicast SPS (i.e., second SPS configuration) is configured with SPS HARQ deferral, and a case in which the UE would be transmitting SPS HARQ-ACK using a HARQ-ACK PUCCH resource (e.g., n1PUCCH-AN or PUCCH SPS-PUCCH-AN-List-r16) which is not valid may be considered. In this case, the UE may transform the NACK-only based HARQ-ACK into ACK/NACK based HARQ-ACK for the second SPS configuration index and then may defer the HARQ-ACK to multicast SPS PDSCH to the target PUCCH slot.

Additionally, with respect to the above example, a case in which ACK/NACK based HARQ-ACK for the SPS configuration index of multicast SPS is configured with SPS HARQ deferral, and a case in which the UE would be transmitting SPS HARQ-ACK using a HARQ-ACK PUCCH resource (e.g., n1PUCCH-AN or PUCCH SPS-PUCCH-AN-List-r16) which is not valid may be considered. In this case, the UE may defer HARQ-ACK to multicast SPS PDSCH to the target PUCCH slot.

(Method 1-3)

If only the SPS configuration(s) configured with NACK-only based HARQ-ACK is configured with SPS HARQ deferral while the SPS configuration(s) configured with ACK/NACK based HARQ-ACK is not configured with SRS HARQ deferral, a method in which NACK-only based HARQ-ACK for the SPS configuration index of the multicast SPS supports SPS HARQ deferral may be considered.

For example, NACK-only based HARQ-ACKs for multiple SPS configurations may be jointly deferred to the target PUCCH slot, and multiplexed on a PUCCH resource selected for multiple NACK-only HARQ-ACKs.

This method may be used only when multiplexing of multiple NACK-only based HARQ-ACKs is based on PUCCH resource selection, not based on transformation to ACK/NACK based HARQ-ACKs.

For another example, NACK-only based HARQ-ACKs for multiple SPS configurations may be jointly deferred to the target PUCCH slot and may be transformed into ACK/NACK based HARQ-ACKs to be multiplexed on a PUCCH resource.

(Method 1-4)

In a case where SPS configuration(s) configured with NACK-only based HARQ-ACK is configured with SPS HARQ deferral, methods such as the following example may be considered.

For example, if only NACK-only based HARQ-ACKs of multiple SPS configurations are jointly deferred to the target PUCCH slot, the corresponding NACK-only based HARQ-ACKs may be multiplexed on PUCCH resources selected for multiple NACK-only based HARQ-ACKs.

For another example, if NACK-only based HARQ-ACK(s) and ACK/NACK based HARQ-ACK(s) of multiple SPS configurations are jointly deferred to the target PUCCH slot, the corresponding NACK-only based HARQ-ACK(s) are dropped, and only ACK/NACK-based HARQ-ACK(s) may be deferred to the target PUCCH slot. Alternatively, if NACK-only based HARQ-ACK(s) and ACK/NACK based HARQ-ACK(s) of multiple SPS configurations are jointly deferred to the target PUCCH slot, NACK-only based HARQ-ACK(s) and ACK/NACK based HARQ-ACK(s) of corresponding SPS configurations may be deferred to the target PUCCH slot. At this time, the corresponding NACK-only based HARQ-ACK(s) may be transformed into ACK/NACK based HARQ-ACK(s). That is, in this case, NACK-only based HARQ-ACK(s) may be transformed to ACK/NACK based HARQ-ACK(s), and may be deferred and transmitted to the target PUCCH slot.

(Method 1-5)

If the PUCCH for NACK-only based HARQ-ACK is allocated to the target PUCCH slot, the UE may defer the HARQ-ACK for the multicast SPS PDSCH to the target PUCCH slot. Here, the corresponding target PUCCH slot corresponds to a slot in which a deferred HARQ-ACK is transmitted based on NACK-only based HARQ-ACK.

On the other hand, if the PUCCH for NACK-only based HARQ-ACK is not allocated to the target PUCCH slot, the UE may not defer the NACK-only based HARQ-ACK for the multicast SPS PDSCH and may drop the NACK-only based HARQ-ACK for the multicast SPS PDSCH. Alternatively, if the PUCCH for NACK-only based HARQ-ACK is not allocated to the target PUCCH slot, the UE may defer HARQ-ACK for the multicast SPS PDSCH to the target PUCCH slot. Here, NACK-only based HARQ-ACK to multicast SPS may be transformed to ACK/NACK based HARQ-ACK for a deferred HARQ-ACK to multicast SPS. That is, in this case, NACK-only based HARQ-ACK may be transformed to ACK/NACK based HARQ-ACK, and may be deferred and transmitted to the target PUCCH slot.

Embodiment 2

This embodiment relates to a method of performing SPS HARQ deferral/drop when a ACK/NACK-based HARQ-ACK scheme is configured for multicast SPS.

For example, a ACK/NACK-based HARQ-ACK scheme may be configured for a specific SPS configuration for multicast SPS purposes having a specific SPS configuration index (e.g., sps-ConfigIndex).

In this case, SPS HARQ deferral/drop may be performed based on one or more of the following methods.

(Method 2-1)

If the SPS HARQ deferral is configured for a first SPS configuration of the unicast SPS, ACK/NACK-based HARQ-ACK for a second SPS configuration of the multicast SPS may support the SPS HARQ deferral.

(Method 2-2)

Regardless of whether SPS HARQ deferral is configured for the unicast SPS, ACK/NACK based HARQ-ACK for a SPS configuration of the multicast SPS may support the SPS HARQ deferral.

(Method 2-3)

ACK/NACK based HARQ-ACK for the multicast SPS may not support the SPS HARQ deferral. In this case, the UE may expect that HARQ-ACK for the SPS configuration index (e.g., SPS-ConfigIndex) of the multicast SPS may not be configured with the SPS HARQ deferral. Alternatively, if ACK/NACK based HARQ-ACK for the SPS configuration index of the multicast SPS is configured with the SPS HARQ deferral, and if the UE would be transmitting the SPS HARQ-ACK using the PUCCH resource (e.g., PUCCH SPS-PUCCH-AN-List-r16 or n1PUCCH-AN) which is not valid, the UE may not defer HARQ-ACK to multicast SPS PDSCH.

Based on the methods described above in the present disclosure (e.g., embodiment 1 and/or embodiment 2, and one or more of the detailed methods in the embodiment), the UE may perform SPS HARQ deferral (i.e., SPS HARQ-ACK deferral) for multicast SPS as follows.

For example, SPS HARQ-ACK dropping for TDD due to PUCCH collision with at least one DL or flexible symbol may be avoided by SPS HARQ-ACK deferral in which the UE may defer SPS HARQ-ACK dropped due to TDD specific collisions until a next available PUCCH based on semi-static configuration of slot format. The SPS HARQ-ACK deferral may be configured per SPS configuration for the multicast SPS. Only HARQ-ACK of SPS PDSCH configurations enabled for deferral is in principle subject to deferral. Only SPS HARQ bits subject to deferral from HARQ-ACK codebook from an initial PUCCH slot may be deferred to the target PUCCH slot. Deferred SPS HARQ bits from more than two 'initial PUCCH slot' may be jointly deferred to the target PUCCH slot. Only SPS HARQ-ACK bits subject to deferral from one or more initial slots which have not reached the maximum deferral value may be jointly deferred to the next available PUCCH (at this tiem, other SPS HARQ-ACK is dropped).

In this regard, the UE may defer SPS HARQ-ACK from the initial slot, only if the SPS HARQ-ACK in the initial slot/sub-slot may not be transmitted as the resulting PUCCH resource for transmission using the PUCCH by SPS-PUCCH-AN-List-r16 or n1PUCCH-AN is not valid. Specifically, the UE may perform first the (Rel-16) UCI multiplexing operation. If after the UCI multiplexing into a PUCCH or PUSCH if any, and if the UE would be transmitting SPS HARQ-ACK using the HARQ-ACK PUCCH resource (e.g., PUCCH SPS-PUCCH-AN-List-r16 or n1PUCCH-AN) which is not valid, the SPS HARQ-ACK configured for deferral may be deferred.

The target PUCCH slot described above in the present disclosure may be defined as in the following example.

For example, the above-described target PUCCH slot may be defined as the next PUCCH slot. Here, sps-PUCCH-AN-List-r16 or n1PUCCH-AN PUCCH resources configured for ACK/NACK-based HARQ-ACK may be regarded as valid. Additionally or alternatively, sps-PUCCH-AN-List-r16 or n1PUCCH-AN PUCCH resources configured for NACK-only based HARQ-ACK may be regarded as invalid. Additionally or alternatively, PUCCH resources (from PUCCH-ResourceSet, i.e., multiplexed DG PDSCH HARQ) may be dynamically indicated.

The corresponding PUCCH resource may be dynamically indicated by unicast DCI format, not by multicast DCI format. Alternatively, the corresponding PUCCH resource may be dynamically indicated by a unicast DCI format or a multicast DCI format for a G-RNTI configured with ACK/NACK based HARQ-ACK, not for a G-RNTI configured with NACK-only based HARQ-ACK. Alternatively, the corresponding PUCCH resource may be dynamically indicated by a multicast DCI format indicating PUCCH for ACK/NACK-based HARQ-ACK, not by a multicast DCI format indicating PUCCH for NACK-only based HARQ-ACK.

Determination of the target PUCCH slot may be based on the total HARQ-ACK payload size including deferred SPS HARQ-ACK information and non-deferred HARQ-ACK information (if any) of the candidate target PUCCH slot. The final PUCCH resource selection in the target PUCCH slot in terms of PUCCH resource set and PUCCH resource ID may follow an existing procedure (e.g., the Rel-16 procedure). If after the target PUCCH slot determination the deferred SPS HARQ-ACK may not be transmitted, the deferred SPS HARQ-ACK bits may not further deferred and dropped.

In the target PUCCH slot, the deferred SPS HARQ-ACK bit may be appended to the initial HARQ bit/Type 1/2 codebook. The bit orderting of the deferred SPS HARQ-ACK information from one or more initial slots in the target PUCCH slot for the multicast SPS may be based on a serving cell index, an SPS configuration index, and an SPS PDSCH slot index.

Regarding the above-described SPS HARQ-ACK, for SPS HARQ-ACK defferd from the initial slot/sub-slot determined by k1 in the activation DCI to the target slot/sub-slot determined by k1+k1def, the UE may check the validity of a target slot/sub-slot evaluating from one slot/sub-slot to the next sub/sub-slot (i.e., in principle k1def granularity is 1 slot/sub-slot). For SPS HARQ-ACK deferral, the limit on the maximum deferral of SPS HARQ is defined in terms of k1eff=k1+k1def. The maximum deferral value in terms of k1+k1def is RRC configured per SPS configuration for multicast SPS. Alternatively, if NACK-only based HARQ-ACK is configured for a SPS configuration, the maximum deferral value in terms of k1+k1def may be configured for all SPS configurations with NACK-only based HARQ-ACK per CFR or per cell or per DL BWP or per G-CS-RNTI. Meanwhile, if ACK/NACK based HARQ-ACK is configured for a SPS configuration, the maximum deferral value in terms of k1+k1def may be specific to the SPS configuration.

Additionally or alternatively, to handle the collision for the same HARQ process due to deferred SPS HARQ-ACK, in case the UE is expected to receive PDSCH of a specific HARQ Process ID according to PDSCH reception method (e.g., refer to TS 38.214 Sec. 5.1), the deferred SPS HARQ bit(s) for the corresponding HARQ Process ID may be dropped. For SPS HARQ-ACK deferral, the initial HARQ-ACK transmission occasion may be considered to determine the out-of-order HARQ condition FIG. 11 is a diagram illustrating an operation of a terminal for an SPS HARQ deferral method according to an embodiment of the present disclosure.

Figure 11:
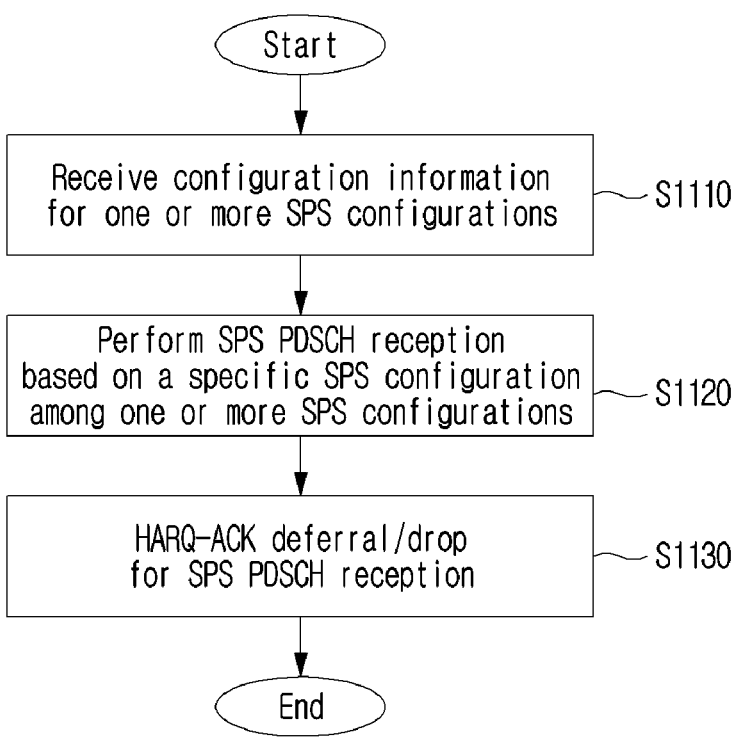
FIG. 11 is a diagram illustrating an operation of a terminal for an SPS HARQ deferral method according to an embodiment of the present disclosure.

In FIG. 11, an operation of the UE based on the proposed above method (e.g., any one or a plurality of combinations of embodiments 1 and 2 and detailed embodiments thereof). An example of FIG. 11 is for convenience of description and does not limit the scope of the present disclosure. Some step(s) illustrated in FIG. 11 may be omitted depending on circumstances and/or settings. In addition, a UE in FIG. 11 is just one example, and may be implemented as the device illustrated in FIG. 13 below. For example, the processor (102/202) of FIG. 13 can control to transmit and receive channels/signals/data/information, etc. (e.g., RRC signaling, MAC CE, DCI for UL/DL scheduling, SRS, PDCCH, PDSCH, PUSCH, PUCCH, PHICH, etc.) using the transceiver (106/206) and can also control to store transmitted or received channels/signals/information/data/information, etc. in the memory (104/204).

Referring to FIG. 11, in step S1110, the UE may receive configuration information on one or more semi-persistent scheduling (SPS) configurations.

Here, the corresponding configuration information may be received through higher layer signaling (e.g., RRC message).

One or more SPS configurations may include a first SPS configuration for a unicast SPS PDSCH and a second SPS configuration for a multicast SPS PDSCH.

Additionally, each of the one or more SPS configurations may be individually associated with one of a first HARQ-ACK mode based on a ACK value and a NACK value and a second HARQ-ACK mode based on a NACK value. For example, the first HARQ-ACK mode may correspond to a ACK/NACK based HARQ-ACK mode, and the second HARQ-ACK mode may correspond to a NACK-only based HARQ-ACK mode.

In step S1120, the UE may perform SPS PDSCH reception based on a specific SPS configuration among one or more SPS configurations.

For example, when a specific SPS configuration is activated, the UE may receive the PDSCH transmitted in the SPS scheme.

In step S1130, when a PUCCH resource related to HARQ-ACK transmission for SPS PDSCH reception is not valid, the UE may defer/drop the corresponding HARQ-ACK transmission, according to a HARQ-ACK mode associated with the specific SPS configuration.

That is, when SPS HARQ deferral is required, HARQ-ACK for the SPS PDSCH may be deferred or dropped depending on which HARQ-ACK mode the corresponding SPS configuration is configured to.

In this regard, the specific SPS configuration may correspond to a multicast SPS configuration (e.g., a second SPS configuration). Additionally or alternatively, the specific SPS configuration may include a SPS HARQ deferral related parameter (e.g., spsHARQdeferral).

As a specific example, if the specific SPS configuration is associated with the first HARQ-ACK mode, HARQ-ACK transmission for the SPS PDSCH according to the specific SPS configuration may be deferred. For example, if the specific SPS configuration is configured to ACK/NACK-based HARQ-ACK, the corresponding HARQ-ACK transmission may be deferred.

If the specific SPS configuration is associated with the second HARQ-ACK mode, HARQ-ACK transmission for the SPS PDSCH according to the specific SPS configuration may be dropped. For example, if the specific SPS configuration is configured to NACK-only based HARQ-ACK, the corresponding HARQ-ACK transmission may be dropped.

If the specific SPS configuration is associated with the second HARQ-ACK mode, HARQ-ACK transmission on the SPS PDSCH according to the specific SPS configuration may be transformed to the first HARQ-ACK mode and deferred. For example, if the specific SPS configuration is configured to NACK-only based HARQ-ACK, the corresponding HARQ-ACK transmission may be transformed to ACK/NACK based HARQ-ACK and deferred.

In this regard, if HARQ-ACK transmission is deferred, the deferred HARQ-ACK transmission may be performed in a subsequent valid PUCCH slot/resource.

Here, the subsequent valid PUCCH slot may correspond to one of PUCCH resources related to the first HARQ-ACK mode. The corresponding PUCCH resources may be configured through higher layer signaling (e.g., sps-PUCCH-AN-List-r16 or n1PUCCH-AN). Alternatively, the subsequent valid PUCCH slot may be indicated by a multicast DCI for the G-RNTI configured to the first HARQ-ACK mode.

With regard to the operation in FIG. 11, the detailed method(s) of the first embodiment and/or the second embodiment described above in the present disclosure may be applied.

Figure 12:
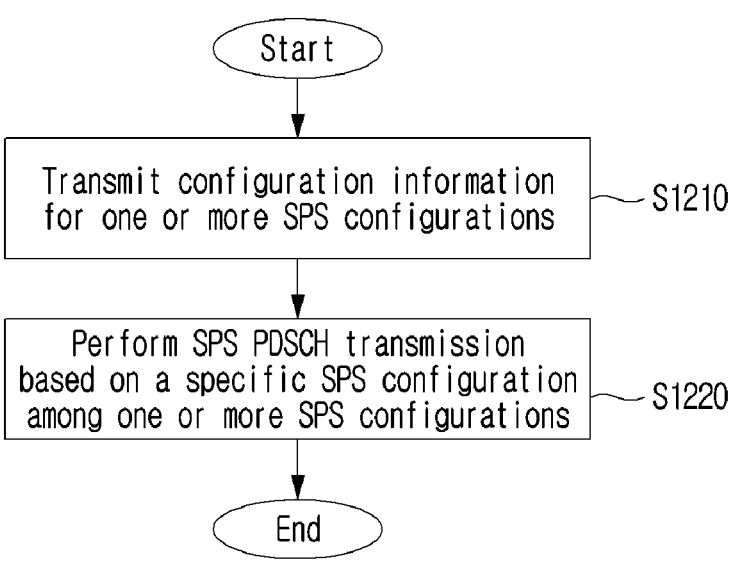
FIG. 12 is a diagram illustrating an operation of a base station for an SPS HARQ deferral method according to an embodiment of the present disclosure.

FIG. 12 is a diagram illustrating an operation of a base station for an SPS HARQ deferral method according to an embodiment of the present disclosure.

In FIG. 12, an operation of the base station based on the proposed above method (e.g., any one or a plurality of combinations of embodiments 1 and 2 and detailed embodiments thereof). An example of FIG. 12 is for convenience of description and does not limit the scope of the present disclosure. Some step(s) illustrated in FIG. 12 may be omitted depending on circumstances and/or settings. In addition, a base station in FIG. 12 is just one example, and may be implemented as the device illustrated in FIG. 13 below. For example, the processor (102/202) of FIG. 13 can control to transmit and receive channels/signals/data/information, etc. (e.g., RRC signaling, MAC CE, DCI for UL/DL scheduling, SRS, PDCCH, PDSCH, PUSCH, PUCCH, PHICH, etc.) using the transceiver (106/206) and can also control to store transmitted or received channels/signals/information/data/information, etc. in the memory (104/204).

Referring to FIG. 12, in step S1210, the base station may transmit configuration information on one or more semi-persistent scheduling (SPS) configurations.

Here, the corresponding configuration information may be transmitted through higher layer signaling (e.g., RRC message).

One or more SPS configurations may include a first SPS configuration for a unicast SPS PDSCH and a second SPS configuration for a multicast SPS PDSCH.

Additionally, each of the one or more SPS configurations may be individually associated with one of a first HARQ-ACK mode based on a ACK value and a NACK value and a second HARQ-ACK mode based on a NACK value. For example, the first HARQ-ACK mode may correspond to a ACK/NACK based HARQ-ACK mode, and the second HARQ-ACK mode may correspond to a NACK-only based HARQ-ACK mode.

In step S1120, the base station may perform SPS PDSCH transmission based on a specific SPS configuration among one or more SPS configurations.

For example, if the specific SPS configuration is activated, the base station may transmit the PDSCH in a SPS scheme.

Since a detailed description of deferral/drop of HARQ-ACK transmission for one or more SPS configuration and SPS PDSCH reception is the same as that described with reference to FIG. 11, duplicated description will be omitted.

With regard to the operation in FIG. 12, the detailed method(s) in the first embodiment and/or the second embodiment described above in the present disclosure may be applied.

According to the above-described embodiment(s) of the present disclosure, a method and apparatus for performing deferral/drop in transmitting HARQ-ACK for a group common SPS PDSCH may be provided.

Additionally, according to the above-described embodiment(s) of the present disclosure, if NACK-only based HARQ-ACK is configured for SPS, a method and apparatus for performing deferral/drop of corresponding HARQ-ACK may be provided.

Additionally, according to the embodiment(s) of the present disclosure described above, SPS HARQ delay operations for unicast SPS and multicast SPS may be clarified.

General Device to which the Present Disclosure May be Applied

Figure 13:
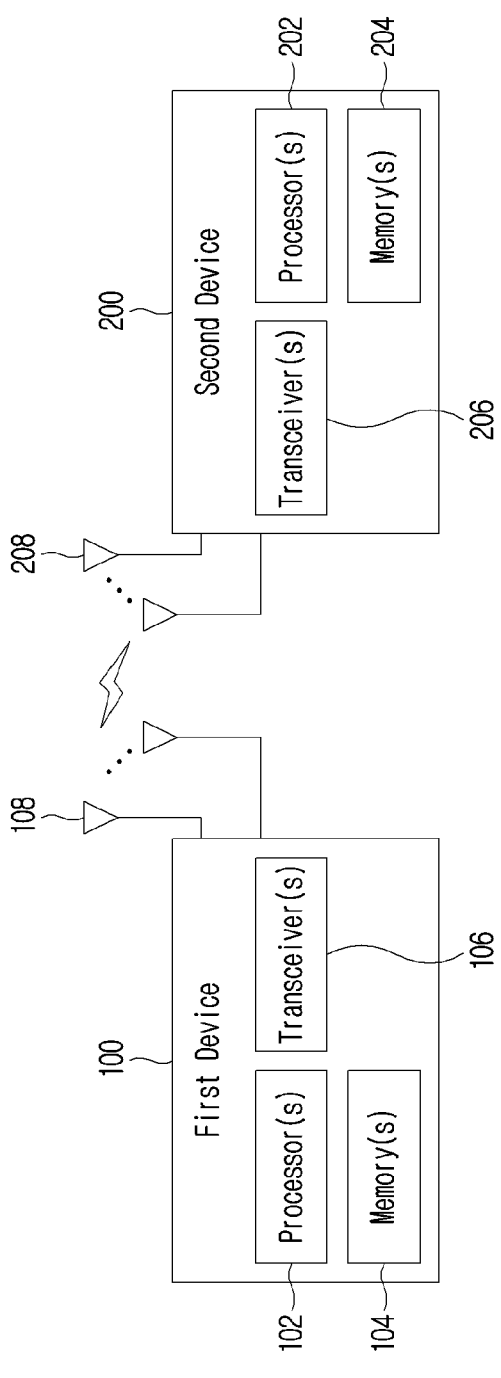
FIG. 13 illustrates a block diagram of a wireless communication device according to an embodiment of the present disclosure.

FIG. 13 illustrates a block diagram of a wireless communication device according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs(Digital Signal Processor), one or more DSPDs(Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device XXX, YYY of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device XXX, YYY of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
   receiving, by a user equipment (UE), configuration information for one or more semi-persistent scheduling (SPS) configurations; and performing SPS physical downlink shared channel (PDSCH) reception based on at least one SPS configuration among the one or more SPS configurations, wherein each of the at least one SPS configuration is related to one of a first hybrid automatic repeat request (HARQ)-ACK mode based on an acknowledgment (ACK) value and a non-acknowledgement (NACK) value, and a second HARQ-ACK mode based on a NACK value, and wherein, based on a PUCCH resource related to a HARQ-ACK transmission for the SPS PDSCH being invalid, the HARQ-ACK transmission is deferred or dropped according to a HARQ-ACK mode for the at least one SPS configuration.

2. The method of claim 1, wherein, based on the at least one SPS configuration being related to the first HARQ-ACK mode, the HARQ-ACK transmission is deferred.

3. The method of claim 1, wherein, based on the at least one SPS configuration being related to the second HARQ-ACK mode, the HARQ-ACK transmission is dropped.

4. The method of claim 1, wherein, based on the at least one SPS configuration being related to the second HARQ-ACK mode, the HARQ-ACK transmission is transformed to the first HARQ-ACK mode and deferred.

5. The method of claim 1, wherein, based on the HARQ-ACK transmission being deferred, the deferred HARQ-ACK transmission is performed in a subsequent valid physical uplink control channel (PUCCH) slot.

6. The method of claim 5, wherein the subsequent valid PUCCH slot corresponds to one of the PUCCH resources related to the first HARQ-ACK mode.

7. The method of claim 6, wherein the PUCCH resources related to the first HARQ-ACK mode are configured through higher layer signaling.

8. The method of claim 5, wherein the subsequent valid PUCCH slot is indicated by multicast downlink control information (DCI) format based on the first HARQ-ACK mode.

9. The method of claim 1, wherein the one or more SPS configurations include a first SPS configuration for a unicast SPS PDSCH and a second SPS configuration for a multicast SPS PDSCH, and wherein the at least one SPS configuration corresponds to the second SPS configuration.

10. The method of claim 9, wherein the at least one SPS configuration include parameters related to SPS HARQ deferral.

11. An apparatus for a user equipment in a wireless communication system, the apparatus comprising:

at least one transceiver for transmitting and receiving a wireless signal; and at least one processor for controlling the at least one transceiver, wherein the at least one processor is configured to:

receive configuration information for one or more semi-persistent scheduling (SPS) configurations; and perform SPS physical downlink shared channel (PDSCH) reception based on a at least one SPS configuration among the one or more SPS configurations, wherein each of the at least one SPS configuration is related to one of a first hybrid automatic repeat request (HARQ)-ACK mode based on an acknowledgment (ACK) value and a non-acknowledgement (NACK) value, and a second HARQ-ACK mode based on a NACK value, and wherein, based on a PUCCH resource related to a HARQ-ACK transmission for the SPS PDSCH being invalid, the HARQ-ACK transmission is deferred or dropped according to a HARQ-ACK mode for the at least one SPS configuration.

12. A base station in a wireless communication system, the base station comprising:

at least one transceiver for transmitting and receiving a wireless signal; and at least one processor for controlling the at least one transceiver, wherein the at least one processor is configured to:

transmit configuration information on one or more semi-persistent scheduling (SPS) configurations; and perform a SPS physical downlink shared channel (PDSCH) transmission based on a at least one SPS configuration among the one or more SPS configurations, wherein each of the at least one SPS configuration is related to one of a first hybrid automatic repeat request (HARQ)-ACK mode based on an acknowledgment (ACK) value and a non-acknowledgement (NACK) value, and a second HARQ-ACK mode based on a NACK value, and wherein, based on a PUCCH resource related to a HARQ-ACK transmission for the SPS PDSCH being invalid, the HARQ-ACK transmission is deferred or dropped according to a HARQ-ACK mode for the at least one SPS configuration.

* * * * *